US011182125B2

(12) United States Patent
Arnold et al.

(10) Patent No.: US 11,182,125 B2
(45) Date of Patent: Nov. 23, 2021

(54) COMPUTING DEVICE SORT FUNCTION

(71) Applicant: Ocient Inc., Chicago, IL (US)

(72) Inventors: Jason Arnold, Chicago, IL (US); George Kondiles, Chicago, IL (US)

(73) Assignee: Ocient Inc., Chicago, IL (US)

( * ) Notice: Subject to any disclaimer, the term of this patent is extended or adjusted under 35 U.S.C. 154(b) by 708 days.

(21) Appl. No.: 16/123,962

(22) Filed: Sep. 6, 2018

(65) Prior Publication Data

US 2019/0073195 A1 Mar. 7, 2019

Related U.S. Application Data

(60) Provisional application No. 62/555,198, filed on Sep. 7, 2017, provisional application No. 62/555,205, filed on Sep. 7, 2017.

(51) Int. Cl.
*G06F 16/2455* (2019.01)
*G06F 16/2453* (2019.01)
(Continued)

(52) U.S. Cl.
CPC ............ *G06F 7/08* (2013.01); *G06F 7/24* (2013.01); *G06F 9/5027* (2013.01);
(Continued)

(58) Field of Classification Search
CPC ......... G06F 16/24535; G06F 16/24554; G06F 16/2456; G06F 7/08; G06F 7/24; G06F 9/5027; G06N 20/10; G06N 7/005
See application file for complete search history.

(56) References Cited

U.S. PATENT DOCUMENTS 5,548,770 A 8/1996 Bridges
6,230,200 B1 5/2001 Forecast
(Continued)

OTHER PUBLICATIONS

Goetz Graefe, Implementing Sorting in Database Systems, 2006, Microsoft, ACM Computing Surveys, v.38 No. 3 article 10, pp. 1-9 (Year: 2006).*

(Continued)

*Primary Examiner* — Taelor Kim
(74) *Attorney, Agent, or Firm* — Garlick & Markison; Timothy D. Taylor

(57) ABSTRACT

A method includes a computing device receiving a sort request regarding data of a table. The method further includes the computing device determining probability traits of the data. The method further includes the computing device dividing the sort request into sub-sort requests based on the probability traits. The method further includes the computing device identifying processing core resources to perform the sub-sort requests based on the probability traits. The method further includes the computing device allocating the sub-sort requests to the identified processing core resources in accordance with the probability traits. The method further includes the computing device allocating data portions to the identified processing core resources in accordance with the probability traits. The method further includes the computing core resources executing allocated sub-sort requests on corresponding divided data portions to produce sorted data portions. The method further includes the computing device joining the sorted data portions.

7 Claims, 19 Drawing Sheets

(51) Int. Cl.
  *G06F 7/08* (2006.01)
  *G06N 7/00* (2006.01)
  *G06F 9/50* (2006.01)
  *G06F 7/24* (2006.01)
  *G06N 20/10* (2019.01)

(52) U.S. Cl.
  CPC .... *G06F 16/2456* (2019.01); *G06F 16/24535* (2019.01); *G06N 7/005* (2013.01); *G06N 20/10* (2019.01)

(56) References Cited

U.S. PATENT DOCUMENTS

| | | | |
|---|---|---|---|
| 6,633,772 | B2 | 10/2003 | Ford |
| 7,499,907 | B2 | 3/2009 | Brown |
| 7,908,242 | B1 | 3/2011 | Achanta |
| 10,402,164 | B1* | 9/2019 | Wanjari ............... G06F 7/16 |
| 2001/0051949 | A1 | 12/2001 | Carey |
| 2002/0032676 | A1 | 3/2002 | Reiner |
| 2004/0061702 | A1* | 4/2004 | Kincaid ............ G16B 45/00 345/440 |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1* | 7/2009 | Kupferschmidt ..... G06F 9/5027 718/104 |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1* | 12/2012 | McWilliams ....... G06F 12/0802 711/103 |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |

OTHER PUBLICATIONS

A new high performance fabric for HPC, Michael Feldman, May 2016, Intersect360 Research.

Alechina, N. (2006-2007). B-Trees. School of Computer Science, University of Nottingham, http://www.cs.nott.ac.uk/~psznza/G5BADS06/lecture13-print.pdf. 41 pages.

An Inside Look at Google BigQuery, by Kazunori Sato, Solutions Architect, Cloud Solutions team, Google Inc., 2012.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplied Data Processing on Large Clusters, OSDI 2004, Jeffrey Dean and Sanjay Ghemawat, Google, Inc.

Rodero-Merino, L.; Storage of Structured Data: Big Table and HBase, New Trends In Distributed Systems, MSc Software and Systems, Distributed Systems Laboratory; Oct. 17, 2012; 24 pages.

* cited by examiner database system 10 computing device 50 node 51 of a computing device 50 node 51 of a computing device 50

MIN IN PAIRING HEAP

EXTRACT MIN

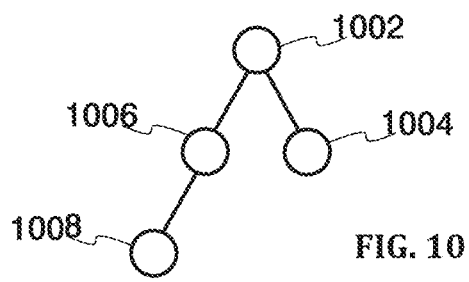
FIG. 10
| ID | NAME |
|---|---|
| 1 | ANNE |
| 2 | ROGER |
| 3 | JACKIE |
| 4 | TED |
1102
| ID | PHONE NUMBER |
|---|---|
| 1 | 321-555-6234 |
| 2 | 739-555-1640 |
| 3 | 739-555-1290 |
| 4 | 632-555-1906 |
1104
FIG. 11
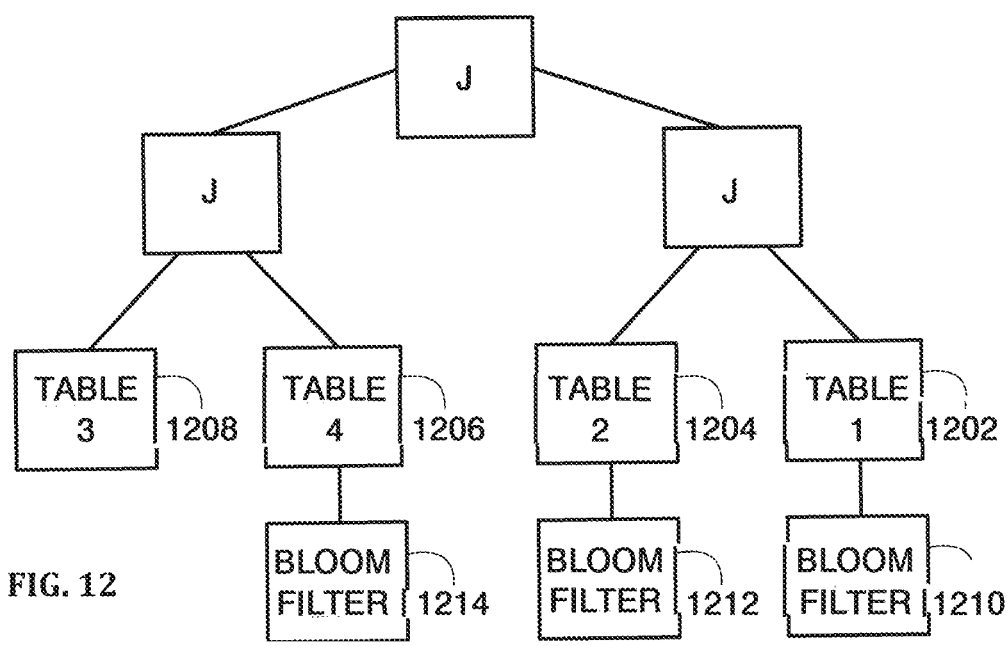
FIG. 12

| Node Pair | Routing Path |
|-----------|--------------|
| (0, 3) | (0, 1, 3) |
| (0, 4) | (0, 2, 4) |
| ⋮ | ⋮ |
300
FIG. 14
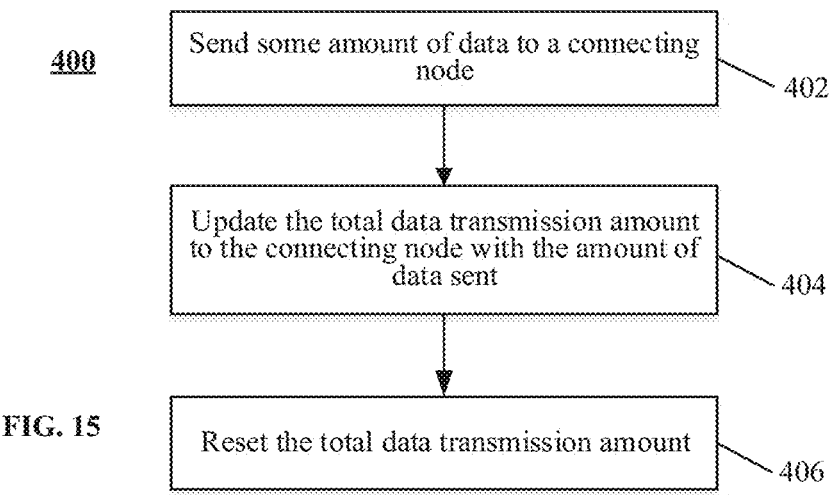
FIG. 15
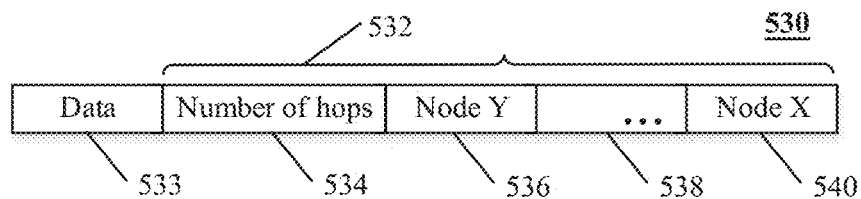
FIG. 16

COMPUTING DEVICE SORT FUNCTION

CROSS-REFERENCE TO RELATED APPLICATIONS

The present U.S. Utility Patent Application claims priority pursuant to 35 U.S.C. § 119(e) to U.S. Provisional Application No. 62/555,205, entitled "SYSTEM AND METHODS FOR IMPROVING PERFORMANCE OF A LARGE SCALE DATABASE MANAGEMENT SYSTEM," filed Sep. 7, 2017 and to U.S. Provisional Application No. 62/555,198, entitled "SYSTEM AND METHODS FOR IMPROVING LOAD BALANCING IN A LARGE DATABASE MANAGEMENT SYSTEM," filed Sep. 7, 2017.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to database processing within one or more computer networks.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 10 is a simplified execution plan constructed in accordance with the present invention;

FIG. 11 is a view of two tables from a database in accordance with the present invention;

FIG. 12 is an illustrative tree structure illustrating the use of a Bloom Filter to greatly improve the performance of a complicated table join in accordance with the present invention;

FIG. 14 is an illustrative static routing table of a variable density binomial graph network of nodes within a database management system in accordance with the present invention;

FIG. 15 is a flowchart depicting a process by which a node within a variable density binomial graph network tracks a total data transmission amount for a connecting node in accordance with the present invention;

FIG. 16 is a simplified block diagram depicting a message with a footer containing a routing path in accordance with t the present invention;

DETAILED DESCRIPTION OF THE INVENTION

Figure 1:
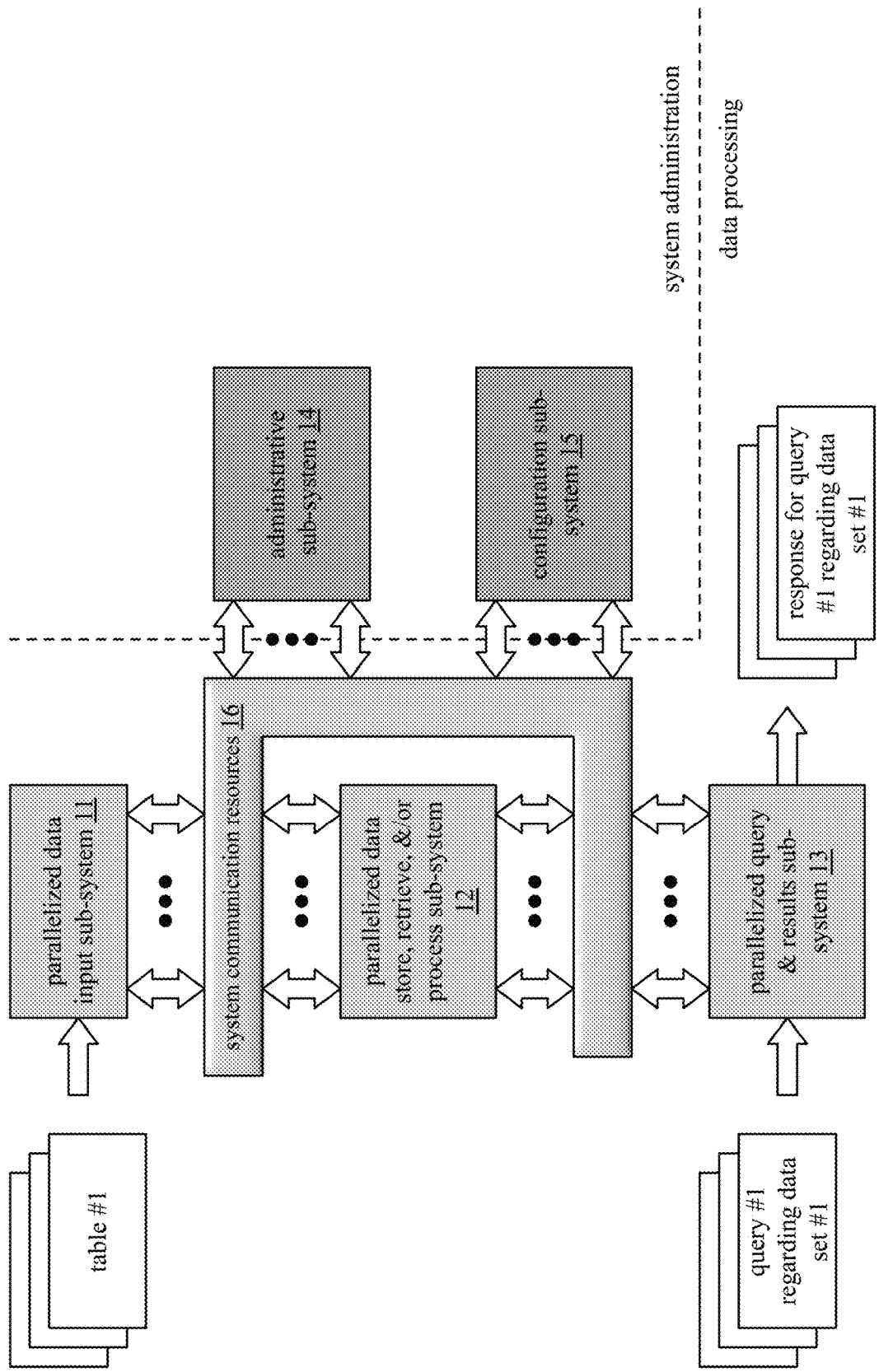
FIG. 1 is a schematic block diagram of an embodiment of a database system in accordance with the present invention.

FIG. 1 is a schematic block diagram of an embodiment of a database system 10 that includes a parallelized data input sub-system 11, a parallelized data store, retrieve, and/or process sub-system 12, a parallelized query and response sub-system 13, an administrative sub-system 14, a configuration sub-system 15, and a system communication resource 16. The system communication resources 16 include one or more of wide area network (WAN) connections, local area network (LAN) connections, wireless connections, wireless connections, etc. to couple the sub-systems 11-15 together. Each of the sub-systems 11-15 include a plurality of computing devices; an example of which is discussed with reference to one or more of FIGS. 3A-3C.

In an example of operation, the parallelized data input sub-system 11 receives tables of data from a data source. For example, a data source is one or more computers. As another example, a data source is a plurality of machines. As yet another example, a data source is a plurality of data mining algorithms operating on one or more computers. The data source organizes its data into a table that includes rows and columns. The columns represent fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data into a plurality of data partitions. For each data partition, the parallelized data input sub-system 11 determines a number of data segments based on a desired encoding scheme. As a specific example, when a 4 of 5 encoding scheme is used (meaning any 4 of 5 encoded data elements can be used to recover the data), the parallelized data input sub-system 11 divides a data partition into 5 segments. The parallelized data input sub-system 11 then divides a data segment into data slabs. Using one or more of the columns as a key, or keys, the parallelized data input sub-system sorts the data slabs. The sorted data slabs are sent to the parallelized data store, retrieve, and/or process sub-system 12 for storage.

The parallelized query and response sub-system 13 receives queries regarding tables and processes the queries prior to sending them to the parallelized data store, retrieve, and/or process sub-system 12 for processing. For example, the parallelized query and response sub-system 13 receives a specific query regarding a specific table. The query is in a standard query format such as Open Database Connectivity (ODBC), Java Database Connectivity (JDBC), and/or SPARK. The query is assigned to a node within the sub-system 13 for subsequent processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.). Once the query plan is optimized, it is sent to the parallelized data store, retrieve, and/or process sub-system 12 for processing.

Within the parallelized data store, retrieve, and/or process sub-system 12, a computing device is designated as a primary device for the query plan and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan. The primary device provides the resulting response to the assigned node of the parallelized query and response sub-system 13. The assigned node determines whether further processing is needed on the resulting response (e.g., joining, filtering, etc.). If not, the assigned node outputs the resulting response as the response to the query. If, however, further processing is determined, the assigned node further processes the resulting response to produce the response to the query.

Figure 2A:
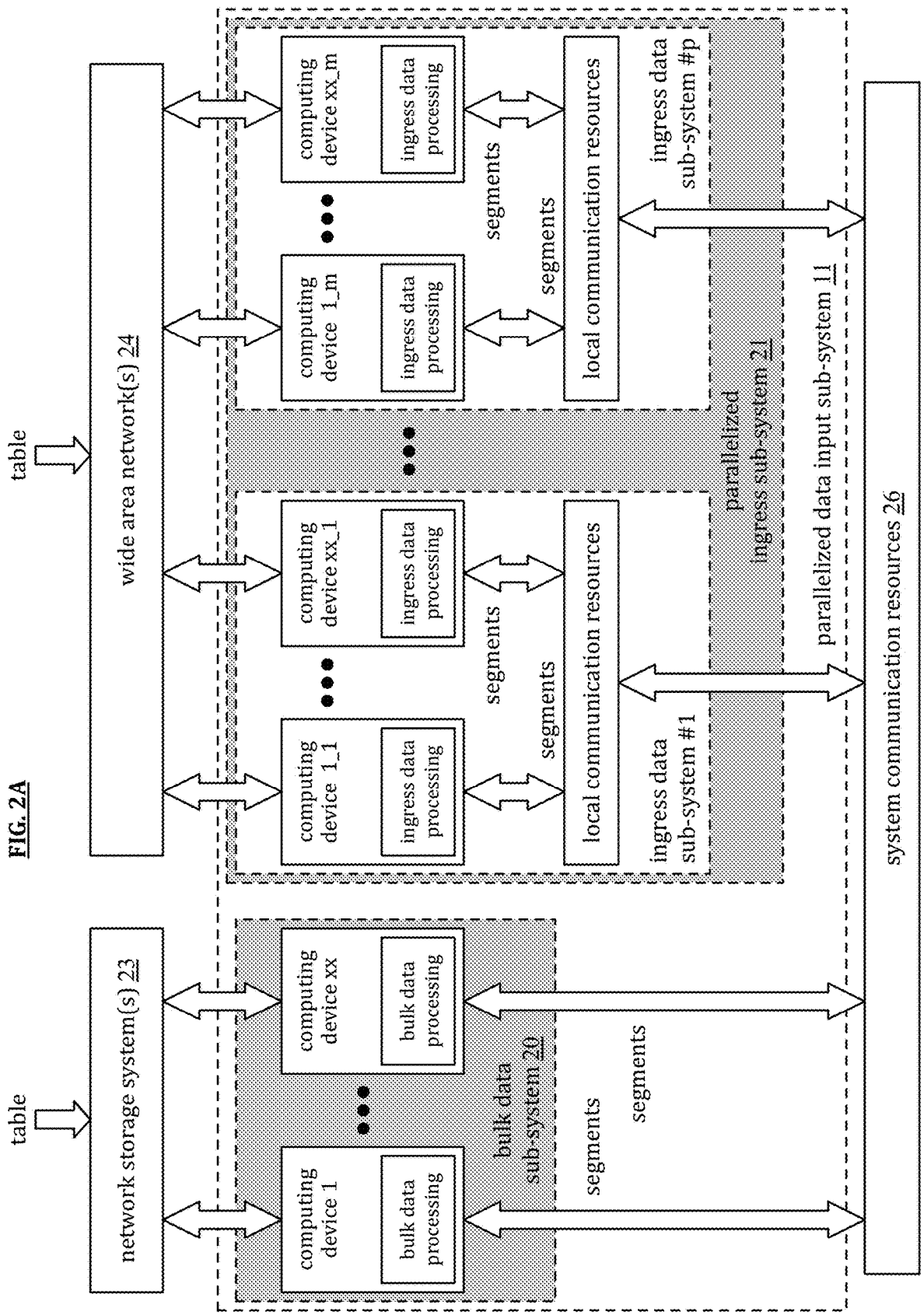
FIG. 2A is a schematic block diagram of an embodiment of a parallelized data input sub-system in accordance with the present invention.

FIG. 2A is a schematic block diagram of an embodiment of a parallelized data input sub-system 11 that includes a bulk data sub-system 20 and a parallelized ingress sub-system 21. Each of the bulk data sub-system 20 and the parallelized ingress sub-system 21 includes a plurality of computing devices. The computing devices of the bulk data sub-system 20 execute a bulk data processing function to retrieve a table from a network storage system 23 (e.g., a server, a cloud storage service, etc.).

The parallelized ingress sub-system 21 includes a plurality of ingress data sub-systems that each include a plurality of computing devices. Each of the computing devices of the parallelized ingress sub-system 21 execute an ingress data processing function that enables the computing device to stream data of a table into the database system 10 from a wide area network 24. With a plurality of ingress data sub-systems, data from a plurality of tables can be streamed into the database system at one time.

Each of the bulk data processing function and the ingress data processing function generally function as described with reference to FIG. 1 for processing a table for storage. The bulk data processing function is geared towards retrieve data of a table in a bulk fashion (e.g., the table is stored and retrieved from storage). The ingress data processing function, however, is geared towards receiving streaming data from one or more data source. For example, the ingress data processing function is geared towards receiving data from a plurality of machines in a factory in a periodic or continual manner as the machines create the data.

As will be described in greater detail with reference to FIGS. 3A-3C, a computing device includes a plurality of nodes and each node includes a plurality of processing core resources. Each processing core resource is capable of executing at least a portion of the bulk data processing function or the ingress data processing function. In an embodiment, a plurality of processing core resources of one or more nodes executes the bulk data processing function or the ingress data processing function to produce the storage format for the data of a table.

Figure 2B:
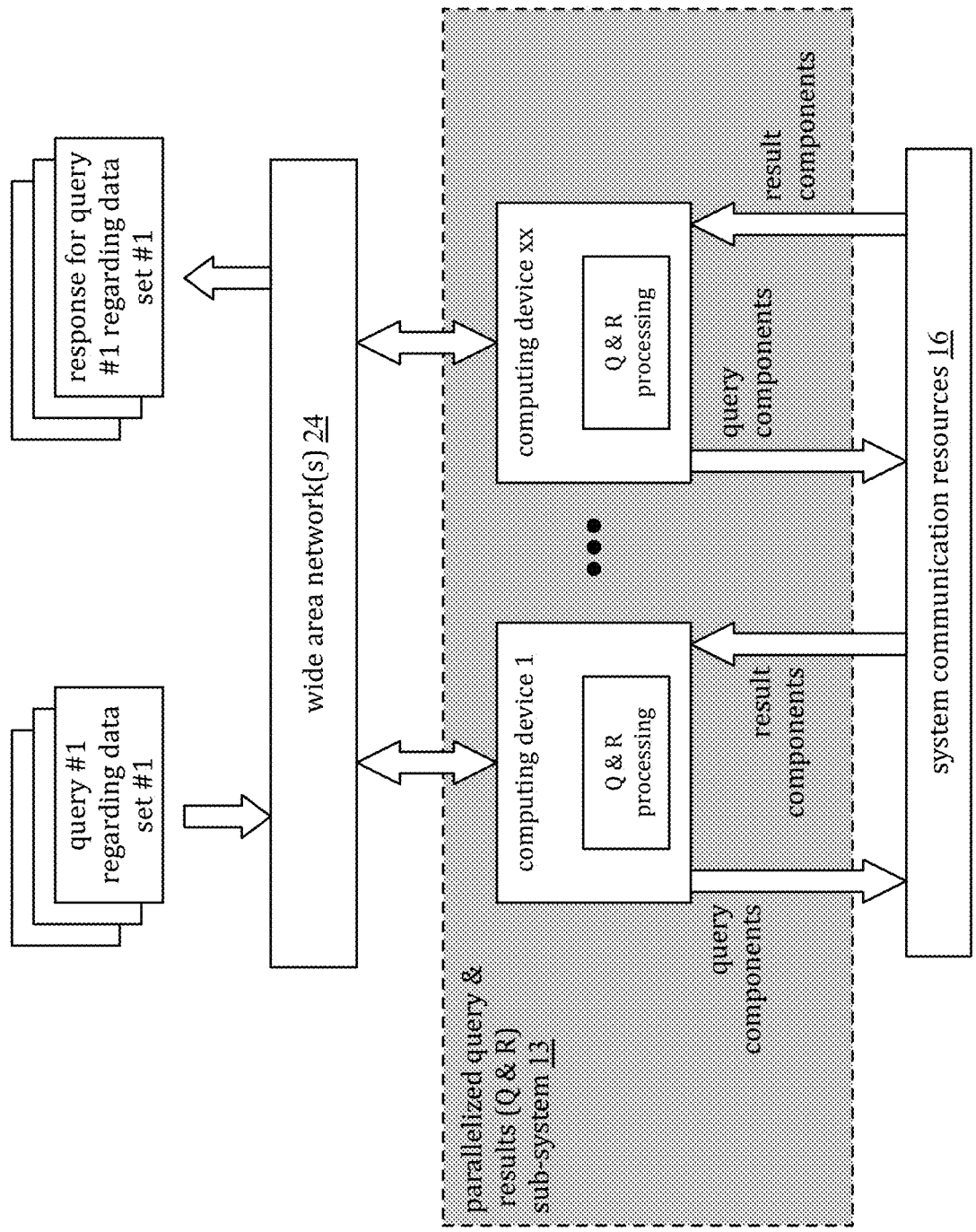
FIG. 2B is a schematic block diagram of an embodiment of a parallelized query and results sub-system in accordance with the present invention.

FIG. 2B is a schematic block diagram of an embodiment of a parallelized query and results sub-system 13 that includes a plurality of computing devices. Each of the computing devices executes a query (Q) & response (R) function. The computing devices are coupled to a wide area network 24 (e.g., cellular network, Internet, telephone network, etc.) to receive queries regarding tables and to provide responses to the queries.

The Q & R function enables the computing devices to processing queries and create responses as discussed with reference to FIG. 1. As will be described in greater detail with reference to FIGS. 3A-3C, a computing device includes a plurality of nodes and each node includes a plurality of processing core resources. Each processing core resource is capable of executing at least a portion of the Q & R function. In an embodiment, a plurality of processing core resources of one or more nodes executes the Q & R function to produce a response to a query.

Figure 2C:
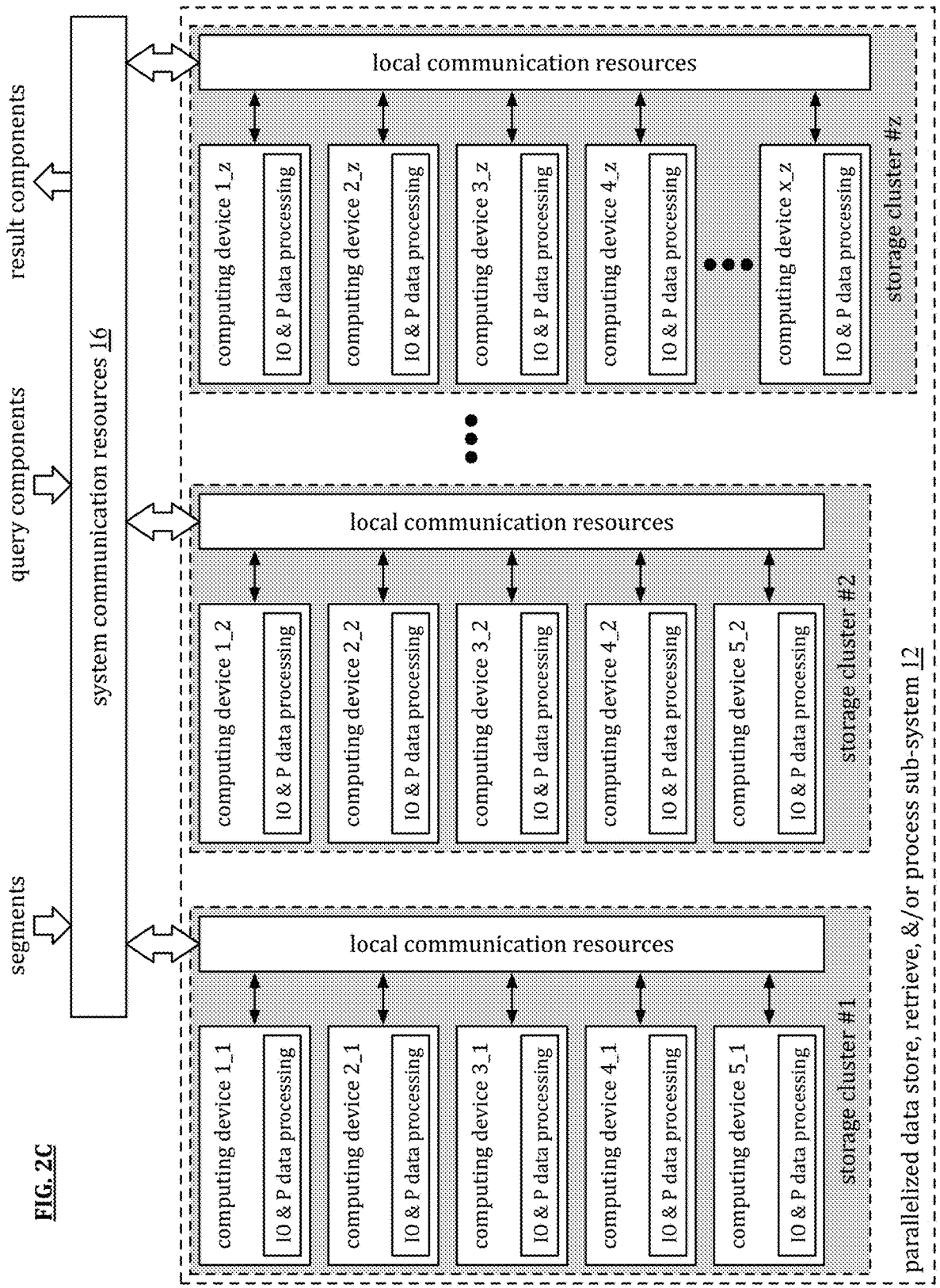
FIG. 2C is a schematic block diagram of an embodiment of a parallelized data store, retrieve, and/or process sub-system in accordance with the present invention.

FIG. 2C is a schematic block diagram of an embodiment of a parallelized data store, retrieve, and/or process sub-system 12 that includes a plurality of storage clusters. Each storage cluster includes a plurality of computing devices and each computing device executes an input, output, and processing (IO &P) function to produce at least a portion of a resulting response. The number of computing devices in a cluster corresponds to the number of segments in which a data partitioned is divided. For example, if a data partition is divided into five segments, a storage cluster includes five computing devices. Each computing device then stores one of the segments.

As will be described in greater detail with reference to FIGS. 3A-3C, a computing device includes a plurality of nodes and each node includes a plurality of processing core resources. Each processing core resource is capable of executing at least a portion of the IO & P function. In an embodiment, a plurality of processing core resources of one or more nodes executes the IO & P function to produce at least a portion of the resulting response as discussed in FIG. 1.

Figure 3A:
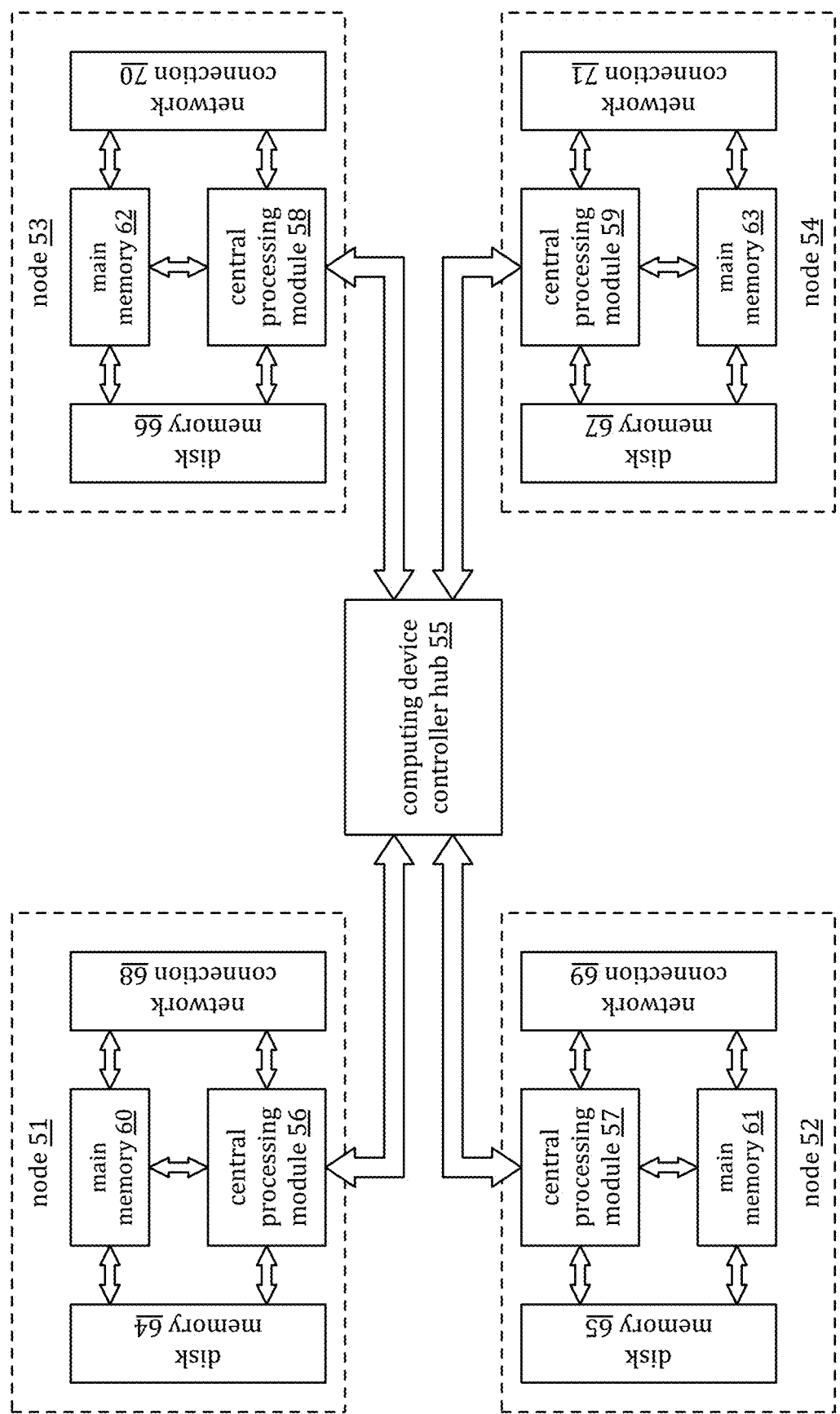
FIG. 3A is a schematic block diagram of an embodiment of a computing device in accordance with the present invention.

FIG. 3A is a schematic block diagram of an embodiment of a computing device 50 that includes a plurality of nodes 51-54 coupled to a computing device controller hub 55. The computing device controller hub 55 includes one or more of a chipset, a quick path interconnect (QPI), and an ultra path interconnection (UPI). Each node 51-54 includes a central processing module 56-59, a main memory 60-63, a disk memory 64-67, and a network connection 68-71. In an alternate configuration, the nodes share a network connection, which is coupled to the computing device controller hub 55 or to one of the nodes.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 3B:
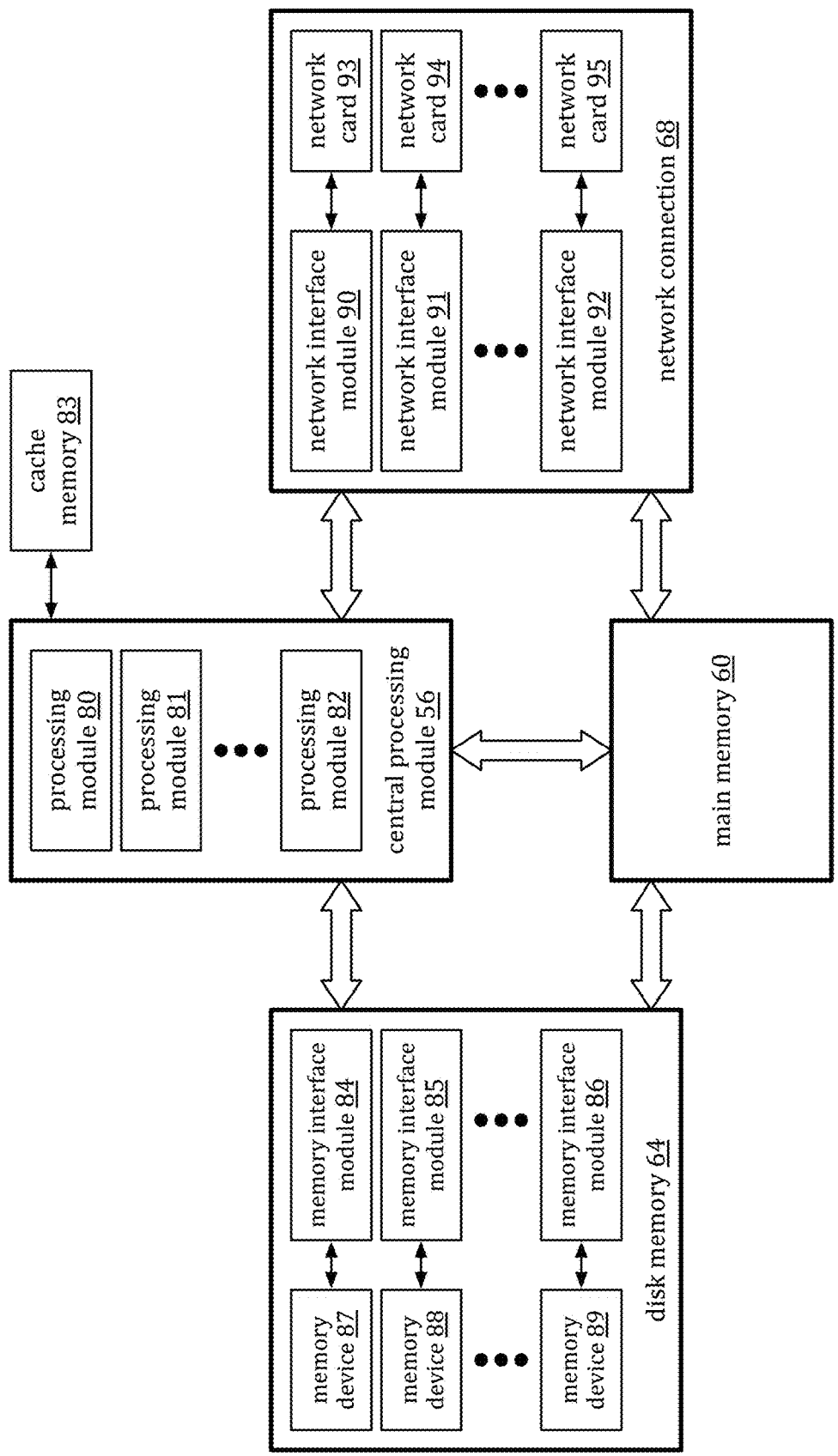
FIG. 3B is a schematic block diagram of an embodiment of a node of computing device in accordance with the present invention.

FIG. 3B is a schematic block diagram of an embodiment of a node 51 of computing device 50. The node 51 includes the central processing module 56, the main memory 60, the disk memory 64, and the network connection 68. The main memory 60 includes read only memory (RAM) and/or other form of volatile memory for storage of data and/or operational instructions of applications and/or of the operating system. The central processing module 56 includes a plurality of processing modules 80-82 one or more cache memory 83. A processing module is as defined at the end of the detail description.

The disk memory 64 includes a plurality of memory interface modules 84-86 and a plurality of memory devices 87-89. The memory devices 87-89 include, but are not limited to, solid state memory, disk drive memory, cloud storage memory, and other non-volatile memory. For each type of memory device, a different memory interface module 84-86 is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 64 includes a plurality of solid state memory devices and corresponding memory interface modules. In another embodiment, the disk memory 64 includes a plurality of solid state memory devices, a plurality of disk memories, and corresponding memory interface modules.

The network connection 68 includes a plurality of network interface modules 90-92 and a plurality of network cards 93-95. A network card 93-95 includes a wireless LAN (WLAN) device (e.g., an IEEE 802.11n or another protocol), a LAN device (e.g., Ethernet), a cellular device (e.g., CDMA), etc. The corresponding network interface module 90-92 includes the software driver for the corresponding network card and a physical connection that couples the network card to the central processing module or other component(s) of the node.

The connections between the central processing module 56, the main memory 60, the disk memory 64, and the network connection 68 may be implemented in a variety of ways. For example, the connections are made through a node controller (e.g., a local version of the computing device controller hub 55). As another example, the connections are made through the computing device controller hub 55.

Figure 3C:
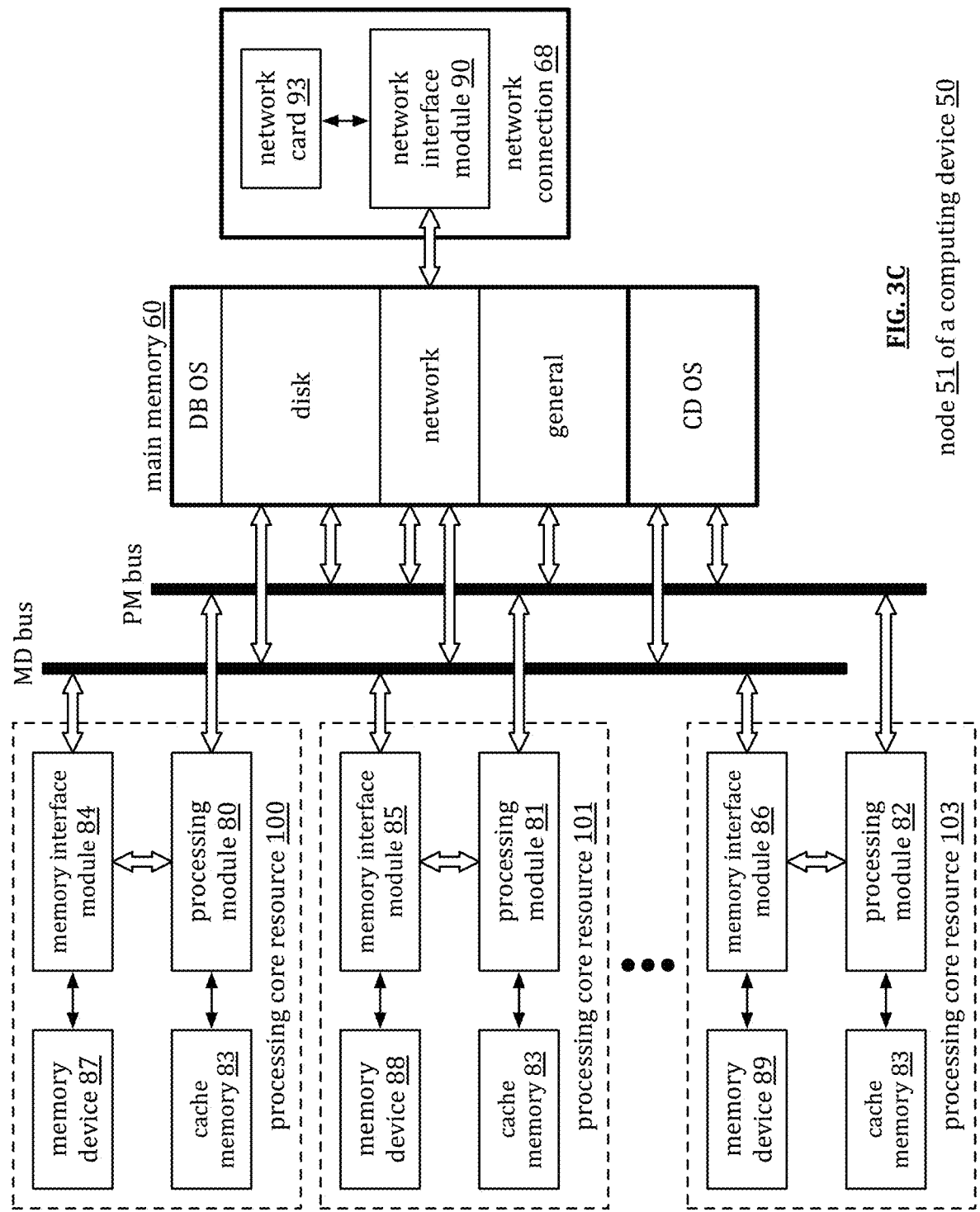
FIG. 3C is a schematic block diagram of another embodiment of a node of computing device in accordance with the present invention.

FIG. 3C is a schematic block diagram of another embodiment of a node 51 of computing device 50. The components of the node are arranged into processing core resources 1001-101. Each processing core resource includes a processing module 80-82, a memory interface module(s) 84-86, memory device(s) 87-89, and cache memory 83. In this configuration, each processing core resource can operate independently of the other processing core resources. This further supports increased parallel operation of database functions to further reduce execution time.

Figure 4:
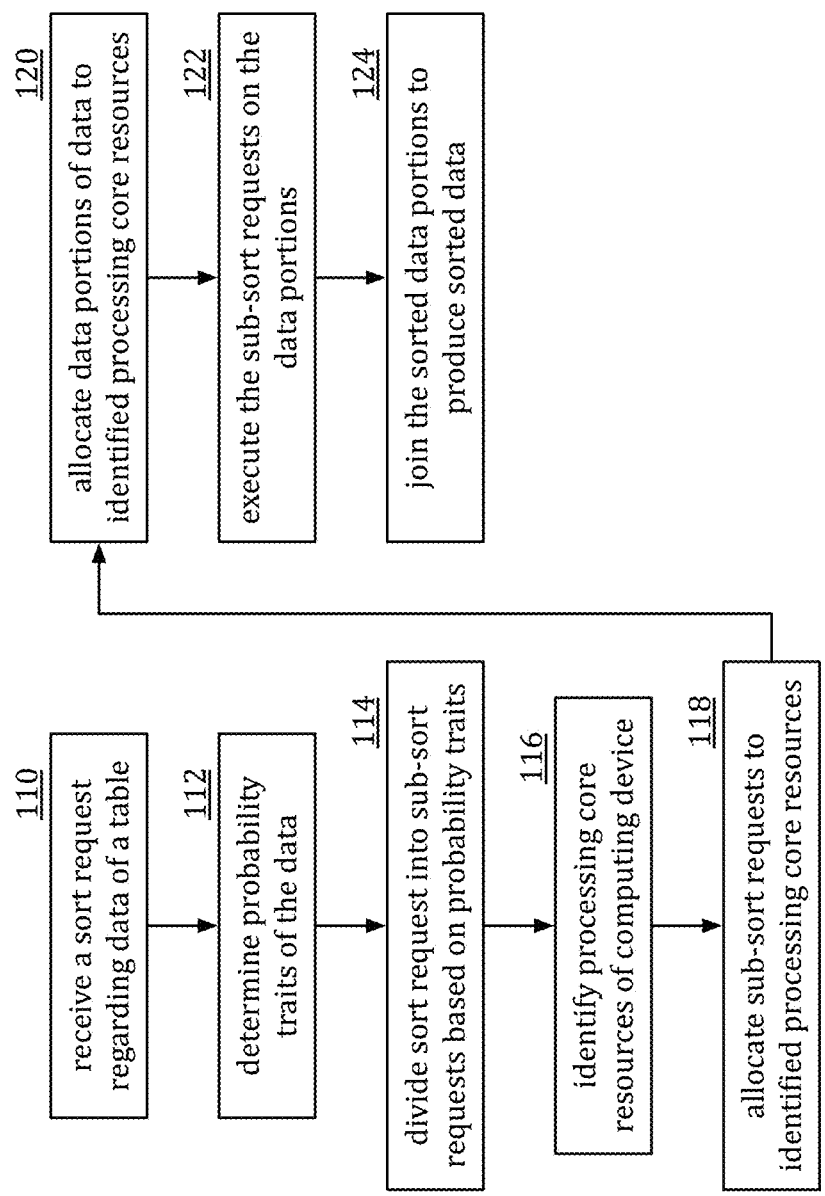
FIG. 4 is a logic diagram of an example of a method of performing an efficient sort function in a database system in accordance with the present invention.

FIG. 4 is a logic diagram of an example of a method of performing an efficient sort function in a database system. The method begins at step 110 where a computing device (a node thereof and/or a computing core resource thereof—hereinafter with respect to FIG. 4, only computing device will be used) receives a sort request regarding data of a table. As an example, the sort request is a query for a particular table. As a specific example, when the table is a company's payroll database, the table may be sorted based on employee last name, on salary, on department, etc.

The method continues at step 112 where the computing device determines probability traits of the data. In general, the probability traits are the likelihood of a data element (e.g., a data field of a column in the table (e.g., salary)) is within a particular range. For example, a company's salaried employees, their salary ranges from $20,000 per year to $3,000,000 per year. The company has 1,000 employees, of which, 15% have salaries in the range of $20,000-$40,000; 35% have salaries in the range of $40,001-$60,000; 25% have salaries in the range of $60,001-$80,000; 15% have salaries in the range of $80,001-$100,000; 5% have salaries in the range of $100,001-$150,000; 2.0% have salaries in the range of $150,001-$200,000; 1.5% have salaries in the range of $200,001-$300,000; 0.75% have salaries in the range of $300,001-$500,000; 0.5% have salaries in the range of $500,001-$1,000,000; and 0.25% have salaries in the range of $1,000,001-$3,000,000. From this example, the probability traits for annual salary corresponds to the percentage of employees having salaries in a given range (e.g., 0.15 for a salary in the range of $20,000 to $40,000).

In an embodiment, the computing device determines the probability traits by performing a probability density function on data elements of a first column of the plurality of columns to produce a first probability density (e.g., annual salary for salaried employees). The computing device then performs the probability density function on data elements of a second column of the plurality of columns to produce a second probability density (e.g., employee department). The computing device then performs the probability density function on the data elements of the first and second columns to produce a third probability density (e.g., percentage of employees of a department in a salary range).

In an embodiment, the computing device determines the probability traits by performing a kernel density estimation on data elements of a first column of the plurality of columns to produce a first probability estimation (e.g., annual salary for salaried employees). The computing device then performs the kernel density estimation on data elements of a second column of the plurality of columns to produce a second probability estimation (e.g., employee department). The computing device then performs the kernel density estimation on the data elements of the first and second columns to produce a third probability estimation (e.g., percentage of employees of a department in a salary range).

The method continues at step 114 where the computing device divides the sort request into sub-sort requests based on the probability traits. In an embodiment, the computing device determines a number of ranges based on the probability density function. For the above payroll example, there are nine ranges of uneven probability densities. To improve sorting efficiency, it is desirable to have the probability densities of the various ranges be about equal. In this example, the initial ranges are not equal. Accordingly, the computing device computing device would adjust the salary ranges to obtain more equal probability densities (e.g., combine the higher salaries into one range and divide some of the smaller salary ranges even further). With the adjusted ranges, the computing device divides the sort request into a number of sub-sort requests corresponding to a multiple (e.g., 1, 2, etc.) of the number of ranges to produce the sub-sort requests.

The method continues at step 116 where the computing device identifies processing core resources to perform the sub-sort requests based on the probability traits. In an embodiment, the computing device determines a number of sub-sort requests and determines a number of processing core resources that will execute the sub-sort requests. Note that a processing core resource may execute more than one sub-sort request. The computing device then identifies the processing core resources based on the number of sub-sort requests and the number of processing core resources executing multiple sub-sort requests.

The method continues at step 118 where the computing device allocates the sub-sort requests (as streams) to the identified processing core resources (which function as threads) in accordance with the probability traits. The method continues at step 120 where the computing device allocates data portions of the data to the identified processing core resources in accordance with the probability traits. For example, one processing core resource is allocated to sort records for employees of a particular department having a salary in the range of $60,001 to $80,000 per year. Another processing core resource is allocated to perform two sub-sorts; one for records for employees of a particular department having a salary in the range of $40,001 to $60,000 per year and another for records for employees of a different department having a salary in the range of $40,001 to $60,000 per year.

The method continues at step 122 where the computing core resources execute their allocated sub-sort request on corresponding divided portion of the data to produce sorted data portions. The method continues at step 124 where the computing device joins the sorted data portions to produce sorted data.

Figure 5:
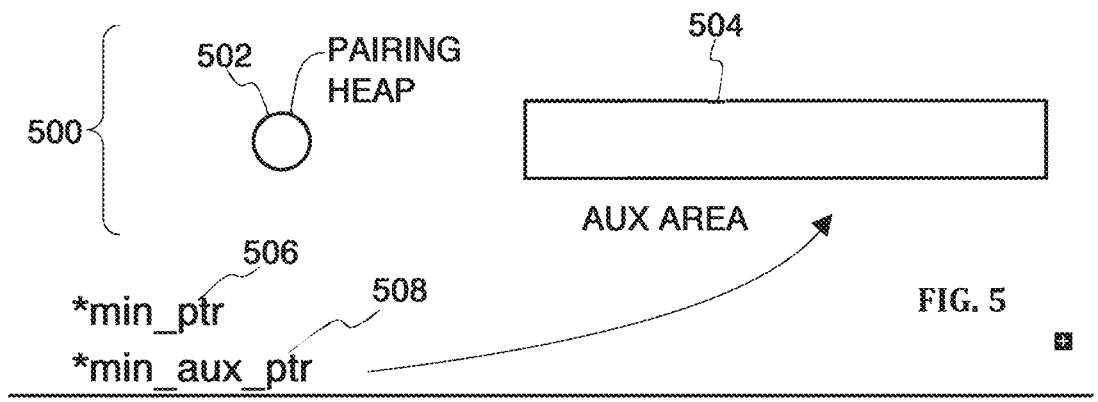
FIG. 5 is an illustrative structure depicting a lazy auxiliary Pairing Heap in accordance with the present invention.

With reference to FIG. 5, a Lazy aux-Pairing Heap, or LAPH is a new data structure and a new way of arranging and using memory within a computer system. A LAPH can be used in any situation where a prior art heap could be used and provides significant advantages in a variety of circumstances. As shown, the LAPH includes a Pairing Heap 502 and auxiliary area 504. While the Pairing Heap 502 is illustrated as a single node, it could be a single node, many nodes, or empty. In addition, the LAPH includes a min_ptr 506 and a min_aux_ptr 508. The min_ptr 506 works similarly to the min_ptr that is used with standard aux-Pairing Heaps; i.e., it always points to the global minimum node. The min_aux_ptr 508, which is unique to the LAPH, points to the minimum value within the auxiliary area.

The LAPH implements the following, which includes corresponding pseudocode:

```
Insert: This function inserts an element into a heap.
insert( val, aux_heap ) {
    if aux_heap.head is null {
        aux_heap.head = Heap( val, [ ] );
        min_ptr = aux_heap.head;
        return;
    } else if aux_heap.aux is empty {
        aux_heap.aux.append( Heap( val, [ ] ) );
        min_aux_ptr = aux_heap.aux.tail;
```

```
        } else {
            aux_heap.aux.append( Heap( val, [ ] ) );
        }
        if val < min_ptr.val {
            min_ptr = aux_heap.aux.tail;
            min_aux_ptr = aux_heap.aux.tail;
        } else if min_ptr == aux_heap.head and min_aux_ptr != aux_heap.aux.tail and
            val < min_aux_ptr.val {
            min_aux_ptr = aux_heap.aux.tail;
        }
    find_minimum:    This function will return the minimum element in the heap.
Pseudocode for this function is as follows:
    find_min( aux_heap )
        min_ptr.val;
    extract_minimum:    This function will return and remove the minimum element from
the heap. In particular, this function will find the minimum element, and delete it from the heap.
Pseudocode for this function is as follows:
    extract_min( aux_heap ) {
        if min_ptr != aux_heap.head {
            extract min_ptr from aux;
            aux_heap.head = merge( aux_heap.head, merge_pairs_mp( aux_heap.aux )
);
            min_ptr = aux_heap.head;
            aux.clear;
            min_aux_ptr = null;
        } else {
            aux_heap.head = merge_pairs( aux_heap.head.children );
            If min_aux_ptr is null then
                min_ptr = aux_heap.head;
            else {
                if aux_heap.head is empty then {
                    aux_heap.head = merge_pairs_mp( aux_heap.aux );
                    min_ptr = aux_heap.head;
                    aux.clear;
                    min_aux_ptr = null;
                } else if aux_heap.head.val < min_aux_ptr.val then
                    min_ptr = aux_heap.head;
                else
                    min_ptr = min_aux_ptr;
            }
        }
    }
```

In particular, as set forth in the pseudocode above, the functionality of the extract_min function depends on where the minimum is located. If the minimum element (assuming this is a min-heap) is in the auxiliary area, the minimum is extracted from the auxiliary area, the remaining are merged into a heap, and the newly formed auxiliary heap is merged with the Pairing Heap. This process is illustrated in FIG. 6.

Figure 6:
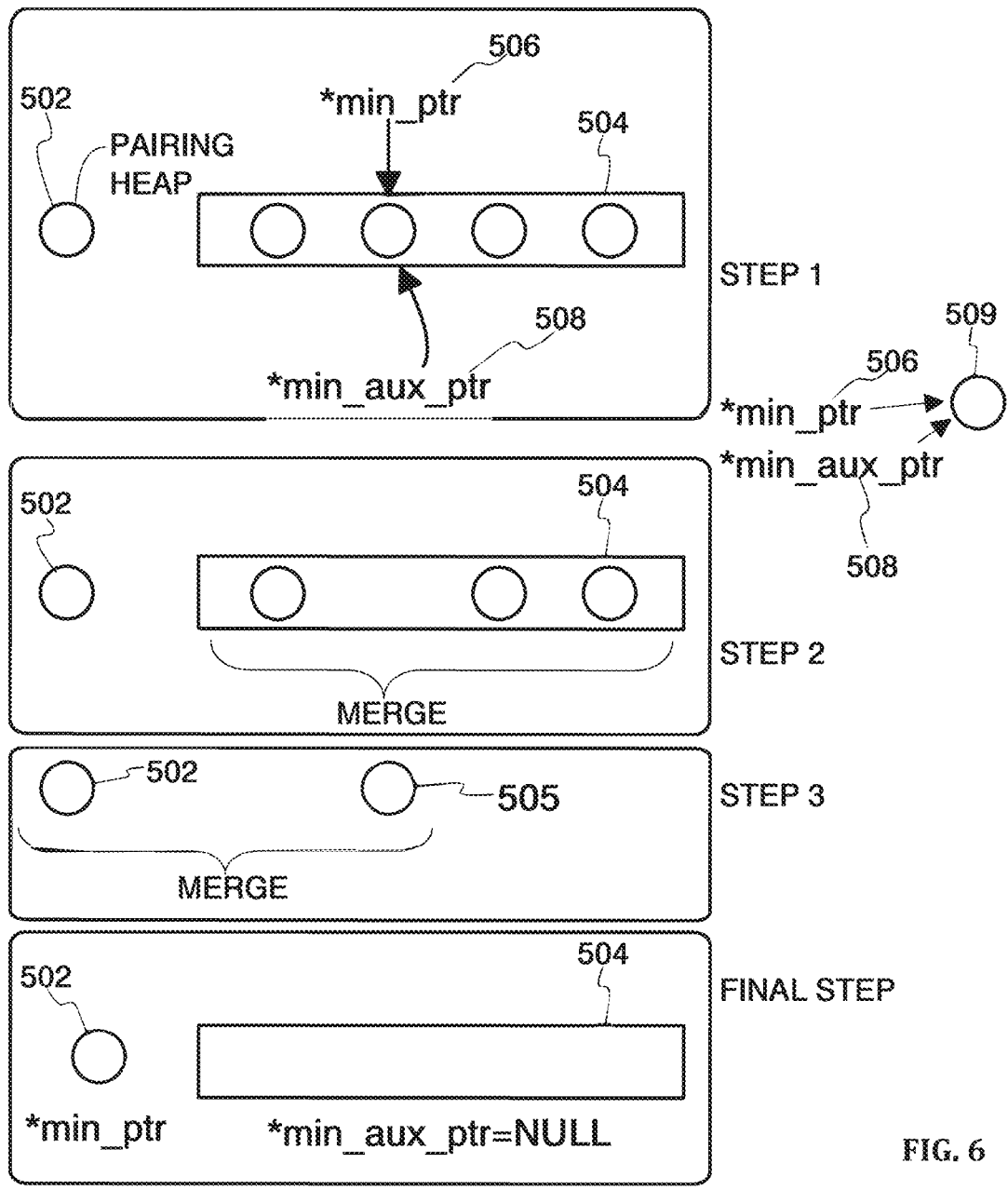
FIG. 6 is a sequence of illustrative structures illustrating the steps in the process of extracting a minimum element from a lazy auxiliary Pairing Heap constructed in accordance with the present invention.

In particular, FIG. 6 illustrates a number of steps in the process of extracting a minimum element from a LAPH. In an initial state, the LAPH includes a Pairing Heap 502 along with an auxiliary area 504. Both the global min_ptr 506 and the aux min_ptr 508 point to a node in the auxiliary area 504. Then the minimum node 509 is extracted from the auxiliary area 504 in step 1. In step 2, the nodes in the auxiliary area 504 are merged into a second Pairing Heap 505. In step 3, the Pairing Heap 504 and the second Pairing Heap 505 are merged into a new Pairing Heap 502, resulting in the final state, where there is a Pairing Heap 502, an empty auxiliary area 504, the min_ptr 506 points to the head of the Pairing Heap 502, and the aux min_ptr 508 is set to NULL; i.e., there is no element in the auxiliary area 504, so the aux min_ptr 508 points to nothing.

On the other hand, if the minimum is in the Pairing Heap, the auxiliary area is left alone. The minimum is extracted from the Pairing Heap, and the Pairing Heap is updated. If nothing is left in the Pairing Heap, then the auxiliary area is turned into a heap, and merged into the Pairing Heap. Otherwise, only the pointers are updated. This process is illustrated in FIG. 7.

Figure 7:
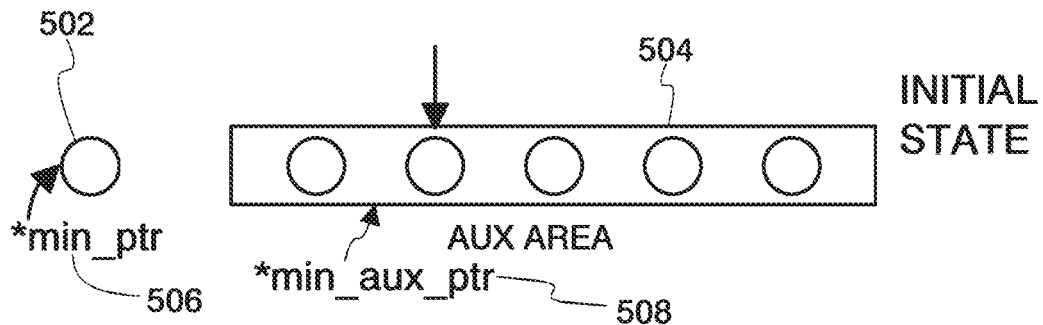
FIG. 7 is a sequence of illustrative structures illustrating an alternative sequence of steps in the process of extracting a minimum element from a lazy auxiliary Pairing Heap constructed in accordance with the present invention.
Figure 7:
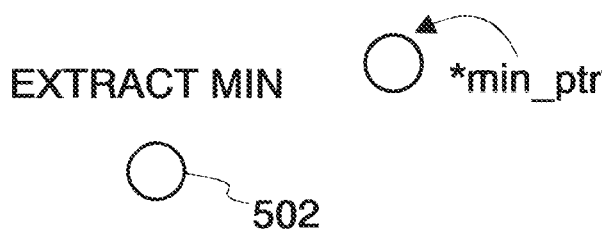
Figure 7:
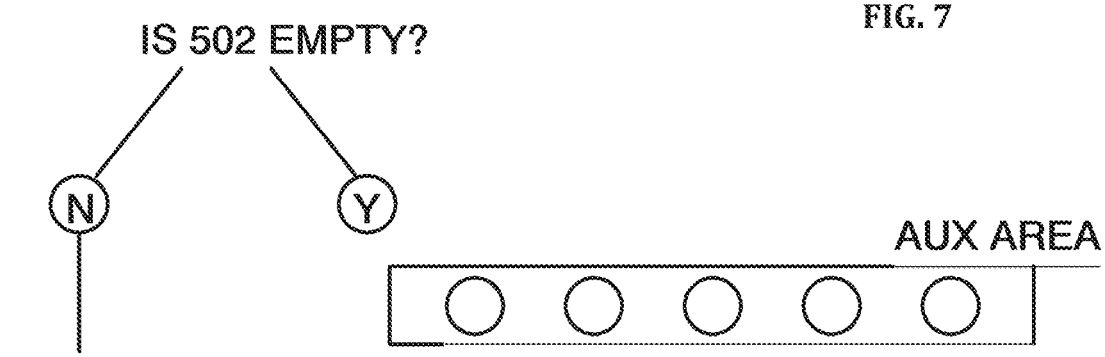
Figure 7:
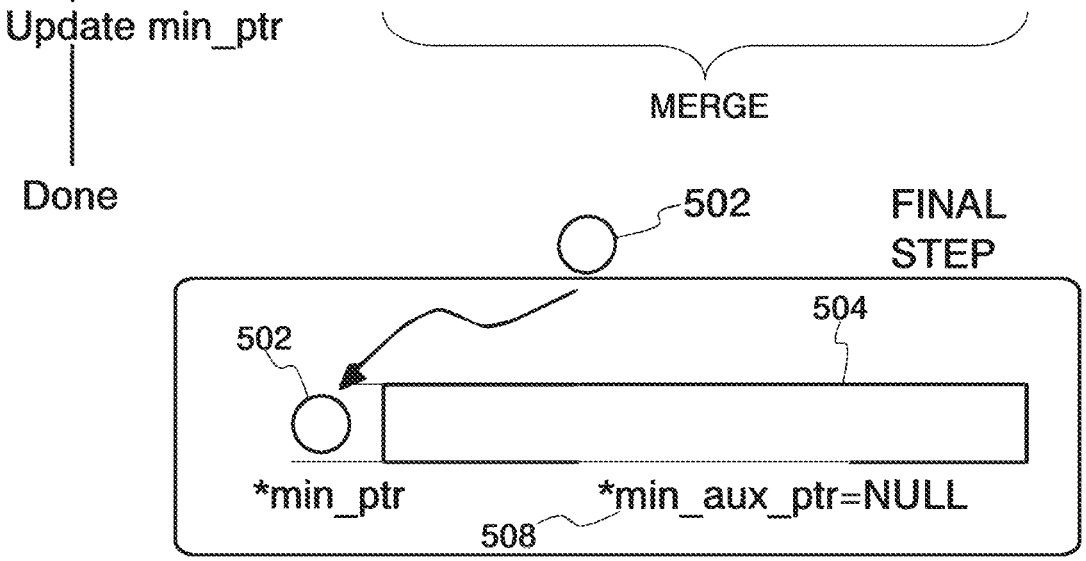

Turning to FIG. 7, in the initial state, the LAPH includes a Pairing Heap 502 and an auxiliary area 504 with a number of nodes in it. The min_ptr 506 points to the head of the Pairing Heap 502. In the first step, the min node 503 is extracted from the head of the Pairing Heap 502. If the Pairing Heap 502 is non-empty, the min_ptr 506 is updated and the extract_min function is complete. On the other hand, if the Pairing Heap 502 is empty, the elements in the auxiliary area 504 are merged into a new Pairing Heap 505, which is the designated as the Pairing Heap 502. The min_ptr 506 is updated to point at the head of the Pairing Heap 502 and the min_aux_ptr 508 is set to point at nothing as the auxiliary area 504 is now empty.

merge: This function will merge one LAPH with another LAPH.

The functions merge_pairs and merge_pairs_mp are identical to those disclosed above for binomial heaps.

For a sequence of operations that include "insert, extract minimum, insert, extract minimum," repeated one or more times, the LAPH is far faster than any other known heap concepts. In particular, when compared to a prior art heap, the LAPH was able to perform 124 million operations per second, compared with 73 million operations for second for the particular input data pattern specified above; i.e., insert, extract minimum, insert, extract minimum, etc. This can greatly speed up a process such as, for example, certain sorting algorithms that are important to database operations, or an ordered gather; i.e., when data is gathered from many different nodes, and ordered.

Figure 8:
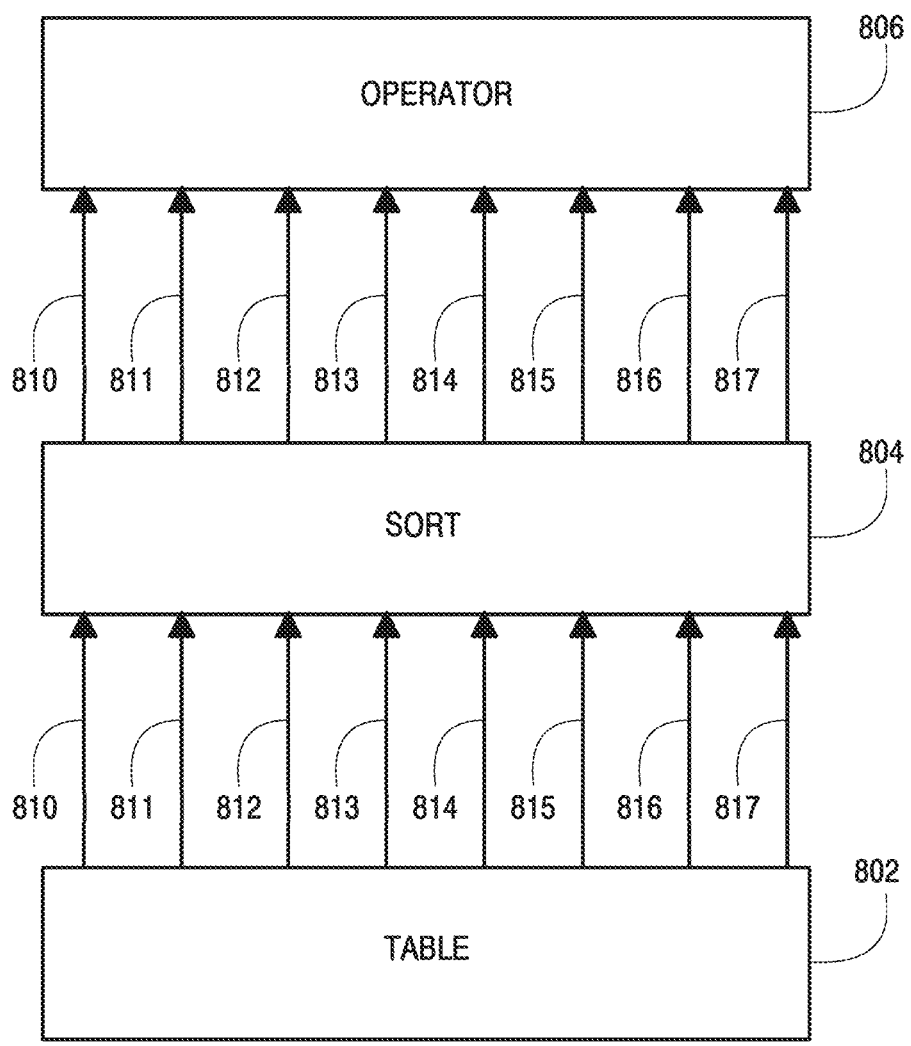
FIG. 8 is an illustrative structure illustrating how a SQL statement can be broken up in accordance with the teachings of the present invention.

Turning to FIG. 8, illustrates a SQL statement that is divided into three segments and corresponding steps. In step 802 a large amount of data is retrieved from a table. The data is then sorted in step 804 to comply with the requirements of the SQL statement. Finally, an operator is applied to the sorted data in step 806. A number of streams 810-817 carry out the operation. Each of the streams 810-817 is assigned to a particular thread, with each thread operating on a processing core resource; note—not all threads necessarily operate on the same processing core, or even the same processor. As discussed below, all of the streams efficiently operate on separate data in a non-blocking, parallel manner. It should be noted that more than one stream can be assigned to the same thread. As each stream is assigned approximately the same amount of work (as discussed herein), in the situation where each stream is assigned to a unique thread, each thread will have approximately the same amount of work to perform.

When the original SQL query is processed, a range of input data; i.e., data that is pulled from the database, is determined. Each stream is then assigned a range of data. However, there are two problems that must be solved to effectively assign ranges to the streams. First, the minimum and maximum of the data that is pulled from the database must be determined. In addition, the data in the database is likely to be distributed non-homogenously, meaning that, if the ranges are split into even buckets, certain streams are likely to have enormous amounts of data to process, while others will have almost none.

The solution presented herein is the use of a probability density function ("PDF") to determine the ranges of input data; i.e., stored database data; that are assigned to each stream. A column distribution can be represented by PDF. For a table with a single column, a one-dimensional PDF can be used. For tables with multiple columns, a multi-variate PDF can be used to describe data distribution of the columns. However, for a set of sampled data, only a finite number of data values are known. Accordingly, kernel density estimation ("KDE") can be used to estimate a corresponding PDF. The benefit of using a single multi-variate PDF instead of multiple one-dimensional PDFs is that a multi-variate PDF also captures covariance between columns. In kernel density estimation, there is uncertainty about data. This is referred to in KDE literature as "the bandwidth." Each dimension has its own bandwidth. The initial bandwidth for each dimension is based on the number of samples, the number of dimensions, and the variance of the data for each dimension.

It is desirable to create new PDFs by combining existing PDFs for disjoint subsets of the data. This provides a way to update the PDF representing an entire table without resampling the entire table when new data is added. Depending on the number of samples involved, this combination procedure may just be a merging of the samples and a recalculation of the bandwidths or it might involve sampling the samples and recalculating the bandwidth.

However, it's not good enough to have a PDF representing the distribution of all the data in all the columns of a table. The PDF representing the distribution of the data at the output of each operator in the execution plan has to be approximated. For example, if half of the data has col1='A' (meaning the value of column 1 is 'A'), half has col1=col2 is always 1 when col1 is 'A', and col2 is always 2 when col1 is 'B', then the PDF representing the output of filtering to only keep the rows where col1='A' should have a zero percent probability (or very close to zero) of having any rows where col2=2. However, the original PDF indicates that the probability of a row having col2=2 is 50%. It is thus clear that each operator changes the PDF; and the new PDFs representing the output of each operator have to be approximated. Generating approximated PDFs thus has to be performed for all types of operators including selection (filtering), projection, aggregation, joins, extension, etc. It should be noted that extension actually creates a new column via calculations on existing columns.

Figure 9:
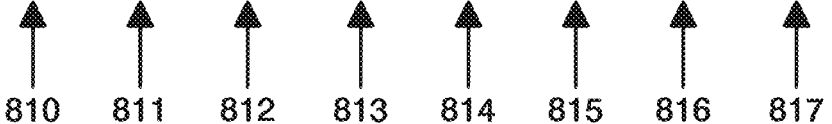
FIG. 9 is an illustrative structure illustrating a plurality of input data streams depositing data into assigned contiguous memory areas based on assigned ranges in accordance with the present invention.

With reference to the assignment of ranges of input data to each stream, a PDF is calculated for the query based on the PDF of the input data, which is in turn based on PDFs stored in the database for the column data. The PDFs determine the ranges so that approximately equal amounts of data are assigned to each stream; i.e., by ensuring that the data density of each stream is approximately equal. As data is read into a stream, it is also sorted. This process is illustrated in FIG. 9. The sequentiality of the data is maintained with lower valued data being assigned to lower number streams, etc.

FIG. 9 depicts input data streams 810-817 depositing data into particular memory bins. For each stream 810-817 is assigned a particular sort memory bin for each range of values that are assigned. Each range 820-827 is assigned to a collection of memory bins as illustrated—one for each stream—as discussed herein, each input stream will deposit data that it processes into one of the memory bins assigned to the range.

In particular, the ranges are assigned using a PDF. The number of assigned ranges will always be a power of 2; i.e., 2, 4, 8, 16, etc.; in this case, 8 ranges are illustrated, but any power of two can be used based on the number of desired streams. An operation can then be performed within the memory bins assigned to each range 820-827. In particular, data deposited into memory bins 8200-8207 correspond to range 820, which corresponds to values less than 'a.' Data deposited into memory bins 8210-8217 correspond to range 821, which includes values between 'a' and 'b.' Data deposited into memory bins 8220-8227 correspond to range 822, which includes values between 'b+1' and 'c.' Data deposited into memory bins 8230-8237 correspond to range 823, which includes values between 'c+1' and 'd.' Data deposited into memory bins 8240-8247 correspond to range 824, which includes values between 'd+1' and 'e.' Data deposited into memory bins 8250-8257 correspond to range 825, which includes values between 'e+1' and 'f.' Data deposited into memory bins 8260-8267 correspond to range 826, which includes values between 'f+1' and 'g." Data deposited into memory bins 8270-8277 correspond to range 827, which includes values greater than 'g.' All of the memory bins have the first three numbers of their corresponding ranges 820-827, with the last digit corresponding to the input stream to which the memory bin is assigned; i.e., stream 0 is 810, stream 1 is 811, etc.

After the memory bins corresponding to a particular range have been loaded, they can easily be sorted. For example, once all data from streams 810-817 are loaded into bins 8200-8207, a single sort can be conducted on all of the data stored in those bins (8200-8207).

This process can be repeated for each operation necessary to accomplish a particular query. In addition, this process and organization has a particular advantage for sorts. In particular, each memory bin 820-827 and 830-837 can be sorted by a particular stream 810-817 so that it is in the proper order. Most importantly, in the case of a sort, every memory bin 820-827 and 830-837 can be filled and sorted, with the entire data set ending up in the proper order with no blocking at all. Multiple streams and multiple threads can be used to divide the work in an elegant and efficient manner. No known prior art database makes use of this particular structure, or offers the enumerated advantages when applied to data sorts.

The same method discussed above with regards to assigning ranges for an input stream for use in, for example, a sort, can also be used when issuing a query to a Spark cluster (or other external clustered system). In particular, the query can be split up so that different pieces can be executed directly from multiple nodes in the cluster, thereby eliminating the need to first fetch data from the database and then distribute it to the various nodes in the cluster. The disclosed database system couples to Spark using a method known in the art, such as, for example, JDBC (Java Database Connectivity). When a query is received, a parser converts the query into a SQL query, which is then passed to the disclosed database system.

An execution plan is created based on the generated SQL query. A sample execution plan is depicted in FIG. 10. As depicted, the execution plan comprises four nodes; 1002, 1004, 1006, and 1008. Each node of the execution plan corresponds to an action, such as data gathering, a mathematical operation on gathered data, a sort, etc., as is known in the prior art. However, unlike the prior art, the disclosed database makes use of a PDF for certain nodes to assign ranges to various portions of the generated SQL query so that those ranges can be successfully parallelized by assigning them to different streams. In particular, for each node, the data that is being processed; i.e., read, operated on, sorted, etc., can be divided into N ranges, as long as the range is a power of two, using the same method that is disclosed above. This allows a complex query to be split into several smaller queries that only produce certain ranges of the output result set.

A join is a type of database operation where columns from different databases are joined together. For example, a first table may have columns of "UNIQUE ID" and "NAME" and a second table may have columns of ID and telephone number as shown in FIG. 11. As is apparent, the first table 1102 contains entries for "ANNE," "ROGER," "JACKIE," and "TED." The second table 1104 contains a single phone number of ANNE, two phone numbers for ROGER, and a phone number of TED. The second table 1104 does not have a phone number for JACKIE.

Typically, when a join is done, all of the entries on the right side of the join are stored in a hash table organized by the shared attribute between the tables, which, in the case of FIG. 11 would be "ID." Then we read through the rows from the left side and attempt to find a match in the hash table for each one. This assumes that there is sufficient memory to hold the entire join; if not, which is the more usual case, then both sides of the join are written to disk row by row using a hash table and then joined in memory. Only one bucket from each hash table on disk is pulled in to memory at a time. This is known as a grace hash join.

As disclosed herein, a Bloom filter can be used to greatly speed up the process of executing a join. In particular, and using the trivial case outlined in FIG. 11, as one side of the join is writing to disk, it can also create a Bloom filter based on the IDs that are present. As one side will almost certainly finish before the other, the Bloom filter can be passed to the execution line that is working to write the other side to the disk, and the Bloom filter can be used as a check to determine if a particular entry needs to be written to disk. In the simple case of FIG. 11, if the right-side execution line; i.e., the execution line assigned to table 1104; should finish first, it can pass its Bloom filter to the left-side execution line (table 1102), which will then be able to avoid writing anything for ID 3 to disk, as there is no corresponding entry in table 1104 to join with the entry for ID 3 of table 1102.

While such an operation would not provide any advantage for the trivial case presented herein, for joins of millions or billions of rows, the advantage can be significant. In particular, in such a case, one side will almost certainly finish long before the other. In many scenarios, one side or the other will have many empty rows. And, where this is the case, the use of a Bloom filter as described herein provides enormous advantages.

In addition, where more than two tables are being joined on the same attributes, the use of a Bloom filter as a first level filter can be even more advantageous. Turning to FIG. 12, a complex join is illustrated. In particular, four tables 1202, 1204, 1206 and 1208 are subjected to a join operation based on a unique field, such as an ID. In particular, whenever an execution line finishes a particular Bloom filter, it can be passed to all other execution lines that are handling tables for the join. Accordingly, if the execution line that is handling table 1202 should finish creating its hash table and Bloom filter first, it will pass the Bloom filter 1210 to the execution lines handling tables 1204, 1206 and 1208. Assuming that the execution line handling table 1204 finishes second, it will then pass its Bloom filter 1212 to the execution line handling tables 1206 and 1208. If the execution line handling table 1206 finishes third, it will then pass its Bloom filter 1214 to the execution line handling table 1208. By sharing Bloom filters in this manner, complex joins can be sped up significantly.

Figure 13:
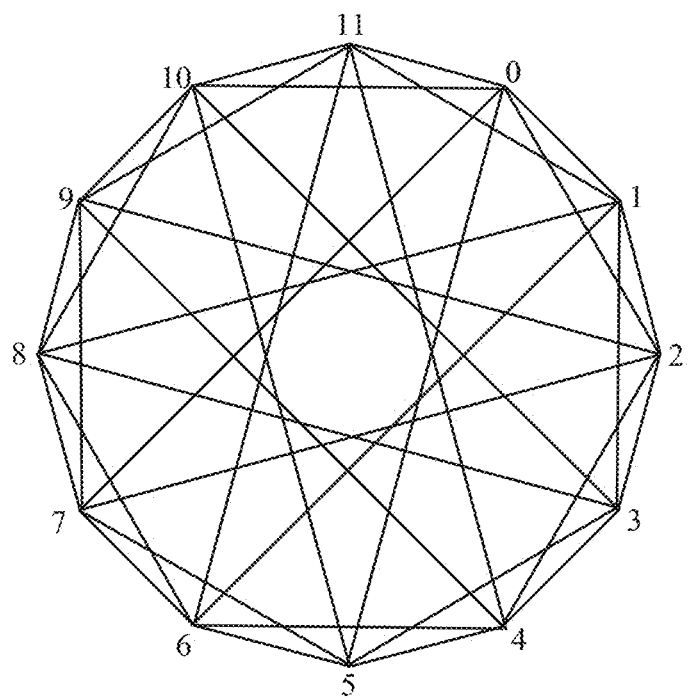
FIG. 13 is an illustrative block diagram of a variable density binomial graph network of nodes within a database management system in accordance with the present invention.

Turning FIG. 13, an illustrative block diagram of a variable density binomial graph network of nodes within a large database management system is shown and generally indicated at 200. In an embodiment, the large database management system includes a large number (such as ten thousand) of database node computers having storage disk drives. The illustrative variable density binomial graph ("VDBMG") network 200 includes twelve nodes of the database system. The VDBMG network 200 provides benefits of a BMG network of database nodes. In addition, the VDBMG network 200 provides improved network load balancing.

The VDBMG network 200 limits the number of nodes that any node can communicate with. The node communication limit is denoted herein as nMax. Applying the node communication limit in the VDBMG network 200 provides numerous benefits. For example, with the node communication limit, the load balancing VDBMG system 200 reduces overhead of handling a large number of connections and thus obtains higher performance. The system performance drops off significantly when the active number connections a node maintains exceeds a threshold, such as 1000 active connections. The actual connections a particular node can engage is determined by Formula 1 below:

Connecting Node ID=round($(N^{1/nMax})^k$), where N stands for the number of nodes in a VDBMG network, and k is an integer starting with value 0.

In the illustrative VDBMG network 200, there are twelve nodes are shown and indicated by 0, 1, 2, 3, 4, 5, 6, 7, 8, 9, 10 and 11. Therefore, N=12. In addition, the node communication limit is set as six (6), i.e, nMax=6. Taking node 0 as an example, the connecting node IDs are determined by Formula 1 and shown in Table 1 below:

| Connecting Node ID | K |
|---|---|
| 1 | 0 |
| 2 | 1 |
| 5 | 2 |
| 12 | 3 |

Table 1 indicates that node 0 communicates with nodes 1, 2 and 5. When k is 3 or bigger, the connecting node ID is 12 or bigger, and greater than (N−1). Accordingly, node 0 communicates with nodes 1, 2 and 5 only. Based on the same reasoning, node 1 only communicates with nodes 2, 3 and 6; node 2 only communicates with nodes 3, 4 and 7; and so on. At this point node 0 only has 3 connections when nMax is set to 6. The other 3 connections get made when the same formula is applied to other nodes. In the case of node 0, it will also have connections to nodes 11, 10, and 7. Moreover, node 0 is allowed to send data to nodes 1, 2, 5, 7, 10, and 11. In other words, node 0 connects out to nodes 1, 2 and 5, and nodes 7, 10 and 11 each connect out to node 0. Compared to the BMG network 100, the VDBMG network 200 allows a node to communicate with fewer other nodes. Accordingly, it is said herein that each node in the VDBMG network 200 has fewer connecting nodes and a smaller number of connecting nodes.

The node connection relationship is maintained in a static routing table by each node in a VDBMG network (such as the VDBMG network 200). An illustrative static routing table of the VDBMG network 200 is shown and generally indicated at 300 in FIG. 14. For each node pair, the routing table 300 provides a routing path between the two nodes. For example, for the nodes 0 and 3, the routing path is from node 0 to node 1 and then to node 3. The routing path is of the shortest length possible. For instance, from node 0 to node 4, there are different routing paths, such as 0-1-2-3-4, 0-1-3-4, and 0-2-4. The shortest path 0-2-4 is configured in the routing path table 300.

In accordance with the present teachings, each node of a VDBMG network (such as the network 200) tracks the amount of data it sends to each of its connecting nodes. Referring now to FIG. 15, a flowchart depicting a process by which a node in a VDBMG network tracks its data transmission is shown and generally indicated at 400. At 402, a computer software program running on the node (such as node 0 of the VDBMG network 200) transmits some amount of data to a connecting node. The transmitted data can be in the format of one or more network messages. At 404, the computer software program updates the total data transmission amount from the node to the connecting node with the amount of data sent at 402. Accordingly, each node within the VDBMG network maintains a total data transmission amount for each of its connecting nodes.

In a further implementation, at 406, the computer software program resets the total data transmission amount. The reset can be initiated periodically, such as every twenty-four hours. The reset can also be triggered by a system command. For example, in response to a network wide reset or event, the node resets all its total data transmission amounts to zero.

When a node sends data to another node within the same VDBMG network, the source node (meaning the sending note) determines a route for sending the data to the destination node (meaning the receiving node). The route is determined based on a static routing table, such as the table 300. An illustrative routing path is shown in FIG. 16. Turning to FIG. 16, a message 530 is constructed by the source node for sending some amount of data 533 from the source node to node Y 536 (i.e., the destination node). The source node determines a routing path to send data 533 to the destination node Y. The source node then sends the message 530 to the first intermediate node of the routing path. Node X 540 is the second intermediate node of the routing path. Other intermediate nodes are indicated at 538. The total number of hops (also referred to herein as hop count) of the message 530 is the number of intermediate nodes. The number of hops is indicated at 534. Accordingly, the routing path of the message 530 from the first intermediate node to node X 540, and eventually to node Y 536 is constructed as a footer 532 attached to the actual message 532 targeted for the node Y 536.

The direction that the message 532 travels starts from the source node, to the first intermediate node, to node X, to other intermediate nodes 538, and to the destination node 536. It should be noted that, when there are no intermediate nodes in the message 530, the fields 536, 538 and 540 are not present in the footer 532. When there is only one intermediate node, the fields 538 and 540 then do not exist in the routing path 532. In other words, the message footer does not need to contain an entry for the node the message is about to be sent or forwarded to. It is implicit by the fact, that a particular node receives the message.

Figure 17:
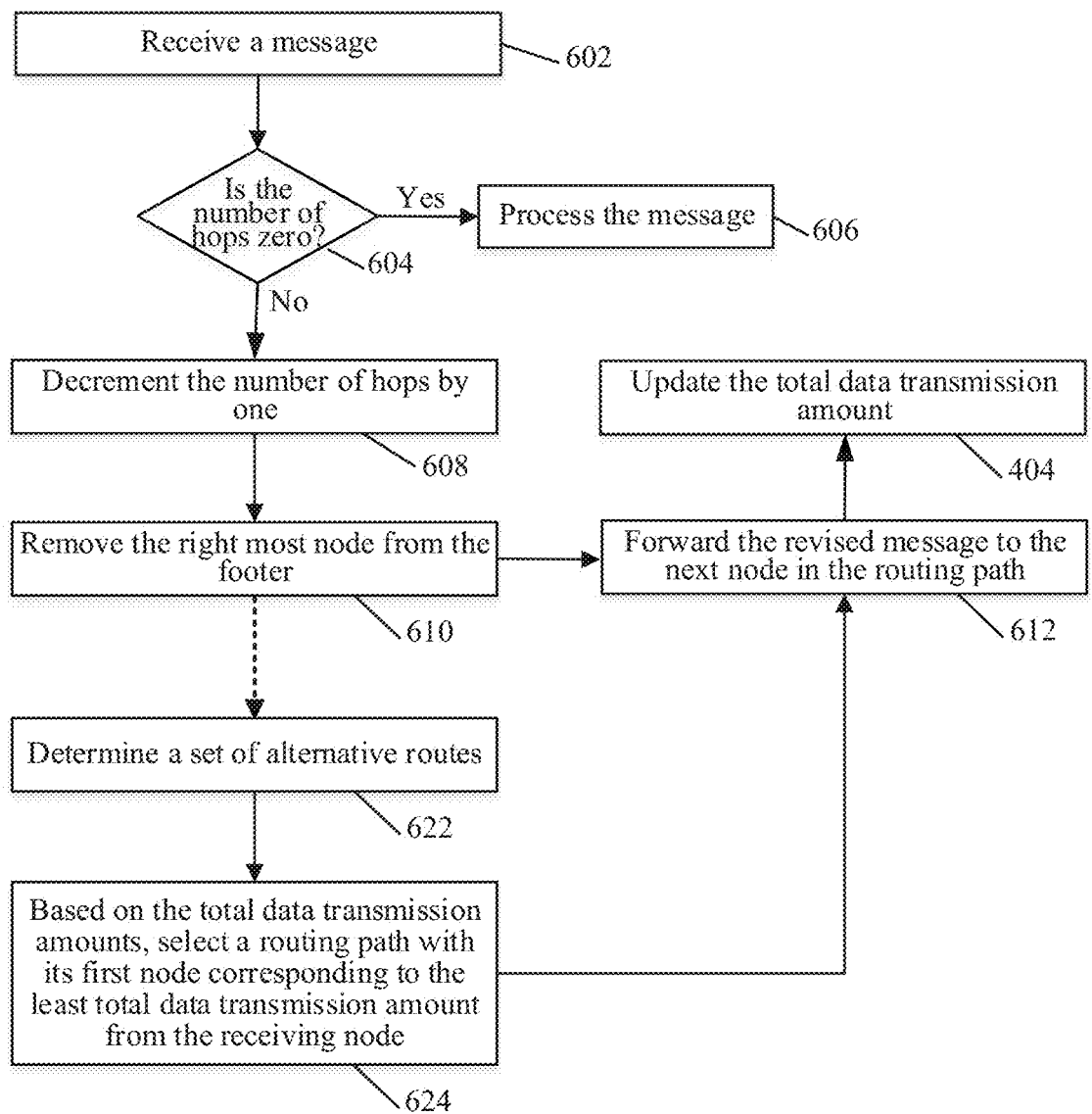
FIG. 17 is flowchart depicting a process by which a node within a variable density binomial graph network routes messages and achieves load balancing in accordance with the present invention.

When a node within a VDBMG network receives a message, such as the message 530, it processes the footer 532. The processing of the routing path 532 by the receiving node is further illustrated by reference to FIG. 6. Referring now to FIG. 17, a flowchart depicting a process by which the receiving node processes the message 530 is shown and generally indicated at 600. At 602, a computer software program running on the receiving node within a large database system receives the message 500. At 604, the computer program examines the number of hops 534. If the number of hops 534 is zero, the receiving node is then the destination node of the data 533. In such a case, at 606, the computer program processes the data 533.

If the number of hops 534 is not zero, it means that the receiving node is an intermediate node (such as node X 540). In such a case, at 608, the computer program decreases the hops 534 by one; at 610, the computer program removes the field 540 from the message 530. The revised message 530 thus includes the field 533, the field 534 with a decreased value, the field 536 and the field 538. At 612, the revised message 530 is forwarded to the next node in the routing path, i.e., the node that was in field 540 before it was removed. At 404, the computer program updates the receiving node's total data transmission amount for the next node in the routing path with the size of the forwarded message.

The right most node of the revised message is next to the field 540 inside the message 530. The revised message is also referred to herein as a routed message and a forwarded message. The routed message can also be constructed differently without deviating from the present teachings. For example, the routed message is constructed by copying the field 533, the field 534 with a decreased value, the field 536 and the field 538. In another implementation, removing the field 540 is achieved by setting the length of the revised message to the length of the message 530 less the length of the field 540. It should be noted that, when there is not any intermediate node in the revised message, the total number of hops 534 is zero and the field 538 is not present in the revised message.

Figure 18:
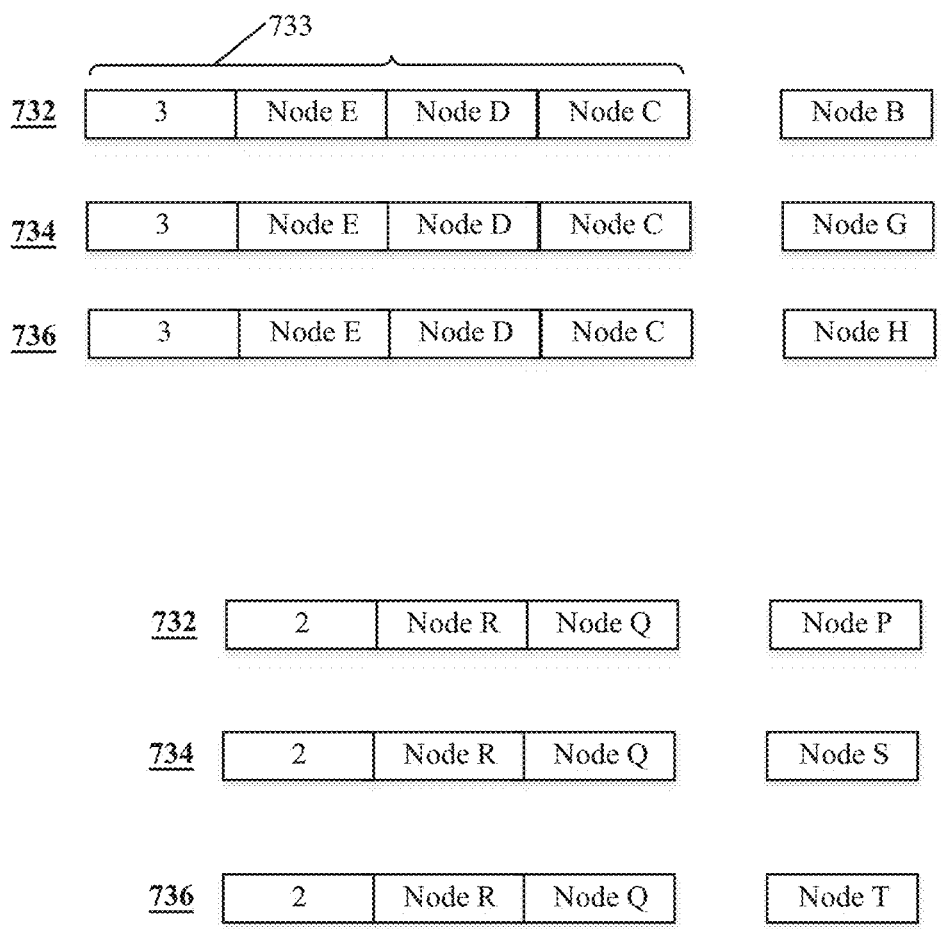
FIG. 18 are simplified block diagram depicting message routing paths within a variable density binomial graph network in accordance with the present invention.

In an alternate embodiment, the receiving node performs an improved rerouting process before the revised message is sent out at 612 to the next node in the routing path. It should be noted that the improved re-routing process is not necessary when the hop count in the revised message is zero. In such a case, there are no intermediate nodes in the routing path anymore. At 622, the computer program determines a set of alternative routes for sending the data 533 to the destination node 536. For example, assuming the routing path in the revised message is routing path 732 shown in FIG. 18, the alternative routing paths include a route 734 and a route 736. Regarding the route 732, the node B is the first intermediate node; and the message 733 is sent to the node B from the current node.

The alternative routing paths 734 and 736 have the same number (i.e., 3) of hops as the routing path 732. For instance, the hops of the routing path 734 are nodes G, C and D with node G being the next hop, node C being the second hop, node D being the third hop, and so on. As an additional example, assuming the routing path in the revised message is routing path 732 shown in FIG. 18, the alternative routing paths include a route 734 and a route 736. The alternative routing paths 734 and 736 have the same number (i.e., 3) of hops as the routing path 732. As used herein, node X of the route 532, node B of the route 732, node E of the route 734, node F of the route 736, node B of the route 732, node E of the route 734 and node G of the route 736 are each referred the first nodes of the corresponding routing paths. Note that regardless of which route a node forwards a message along, the forwarded message is identical. This is because the next hop (the immediate destination of a message) does not need to be explicitly stored in the route in the message footer.

In the illustrative implementation, at 622, the computer program only determines alternate routes from the receiving node (also referred to herein as the current node) to the second node. Taking the routing path 732 as an example, at 622, the computer program determines alternate routes from the current node the second node C. The alternate routes are from the current node to node G and then to node C, and from the current node to node H and then to node C. Accordingly, in the illustrative implementation, alternate routing paths only differ in the next nodes. The different next nodes each directly connect to the second node and the current node. By examining only two hops ahead to determine the alternate routing paths, the current node minimizes the amount of system processing required to perform load balancing. The minimized system processing saves time and resources used by the current node. Furthermore, this approach is flexible enough that that it is possible that none of the intermediate nodes of an originally created static route are used in sending data, except the originating node and the destination node. Moreover, this approach ensures that alternate routes do not become longer (meaning having more hops).

At 624, from the routing path in the revised message and the alternative routing paths, the computer program selects a new routing path that improves the load balancing of the VDBMG network. As used herein, the routing path in the revised message and the alternative routing paths determined at 622 are collectively referred to as the candidate routes. In one implementation, at 624, the new routing path is selected based on the receiving node's total data transmission amounts. For instance, the route with its first node corresponding to the receiving node's least total data transmission amount is selected. Taking the candidate routes 732-736 as an example, the receiving node selects the candidate route whose first node corresponds to the receiving node's smallest total data transmission amount between the nodes B, E and F.

At 612, the revised message is forwarded to the first node of the selected route. With the re-routing of the data 502, the receiving node avoids sending significantly more data to one node than other nodes, and thus avoids imbalance and achieves load balancing within the VDBMG network. In other words, the VDBMG network improves load balancing of conventional BMG networks.

In SQL query optimization, column cardinality of a column of a database table can be used to significantly improve a database system's performance in executing a SQL query. The performance improvement can be reduced execution time and/or reduced requirement for system resources. In one implementation, column cardinality is estimated to avoid the system cost in accurately determining it. Column distribution statistics, such as a probability density function ("PDF"), of columns of a database table is also used in optimizing SQL query execution.

When optimizing SQL queries, it is oftentimes desirable to determine the cardinality of a column set. For example, an aggregation sometimes involves a grouping operation. Assume that an aggregation is grouped by columns C1 and C2, the cardinality of the column set (C1, C2) is the total number of distinct data tuples (C1, C2). Knowledge of the cardinality of the column set (C1, C2) is an important factor in optimizing the SQL query involving the aggregation operation since it determines the number of output tuples. It is thus desirable to determine the cardinality of the column set. The column set cardinality has an upper bound, i.e., the product of cardinalities of the columns in the column set. Taking the column set (C1, C2) as an example, one upper bound of the cardinality of the column set is the product of the cardinalities of the columns C1 and C2, i.e. $C(C1)*C(C2)$, wherein $C(C1)$ and $C(C2)$ stand for the cardinality of the columns C1 and C2 respectively.

Since determining the exact value of a column cardinality is time consuming and becomes adverse to the SQL query optimization, the column cardinality is estimated at a much lower system cost. The estimated cardinalities of columns C1 and C2 are denoted as EC1 and EC2 respectively. $EC1*EC2$ is thus a reasonable upper bound for the estimated column set cardinality. Similarly, determining the exact value of a column set cardinality is time consuming and becomes adverse to the SQL query optimization. Accordingly, a novel solution to estimate the column set cardinality at a lower cost is disclosed herein.

In one implementation, each column in the column set has discrete data values, such as a column of integers, date time or Internet Protocol addresses. Moreover, each column (also referred to herein as a dimension) in the column set meets a denseness requirement. In other words, each dimension's estimated cardinality (EC) is approximately the same as the difference between the maximum value and the minimum value in the column set. In one implementation, the EC is said to be approximately the same as the difference between the maximum value (MaxC) and the minimum value (MinC) in the column set when $(MaxC-MinC)>=0.9*EC$. The formula means that the difference between MaxC and MinC is at least the product of 0.9 and EC. In other words, the particular column needs to be at least 90% dense. The denseness requirement threshold 0.9 can be configurable in a large database management system in accordance with the present teachings. For instance, the denseness requirement threshold can be set to 0.92

Figure 19:
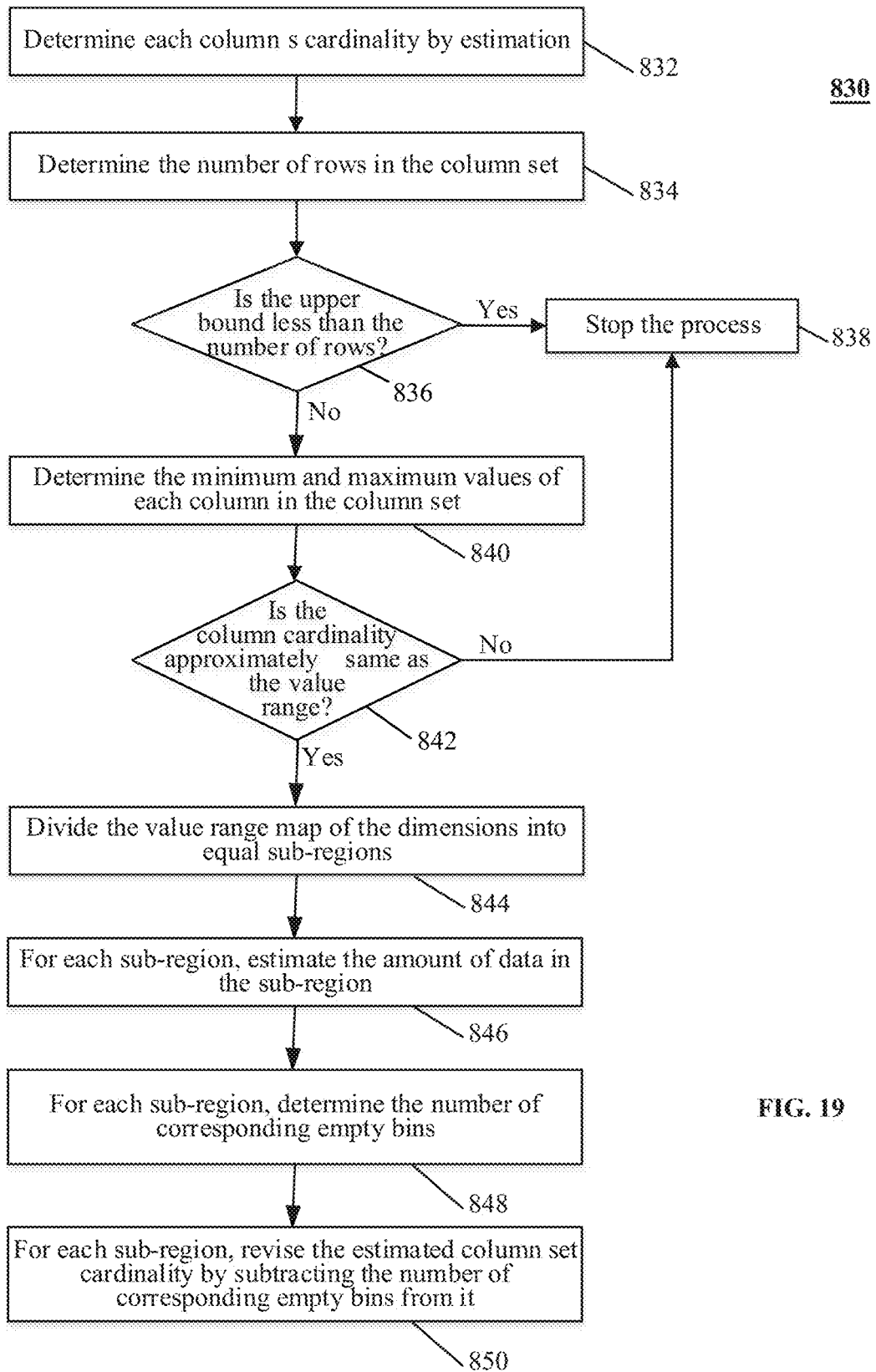
FIG. 19 is an illustrative flowchart depicting a process by which a node within a large database system determines column set cardinality in accordance with the present invention.

The estimation of a column set's cardinality is further illustrated by reference to FIG. 19. Turning to FIG. 19, a flowchart depicting a process 830 by which a node within a large database management system estimates a column set's cardinality is shown. At 832, a computer software program running on a node determines each column's cardinality using estimation. At 804, the computer software program determines the number of rows in the column set. At 836, the computer program determines whether the product (such as EC1*EC2) of the column cardinalities estimated at 832 is bigger than the number of rows of the column set. If not, at 838, the computer program stops the process 830. In other words, the computer program no longer performs additional elements of the process 830 in such a case.

Turning back to 836, if the upper bound is greater than or equal to the number of rows, at 840, the computer program determines the minimum and maximum values of each dimension of the column set. At 842, for each dimension, the computer program determines whether the estimated column cardinality is approximately same as the value range. The value range is the difference between the maximum value and the minimum value. If the answer is no for any column, at 848, the computer program stops the process 830. Otherwise, at 844, the computer program divides the value range map into a number of sub-ranges (such as halves) on each dimension. An illustrative two dimensional value range map is illustrated by reference to FIG. 20.

Figure 20:
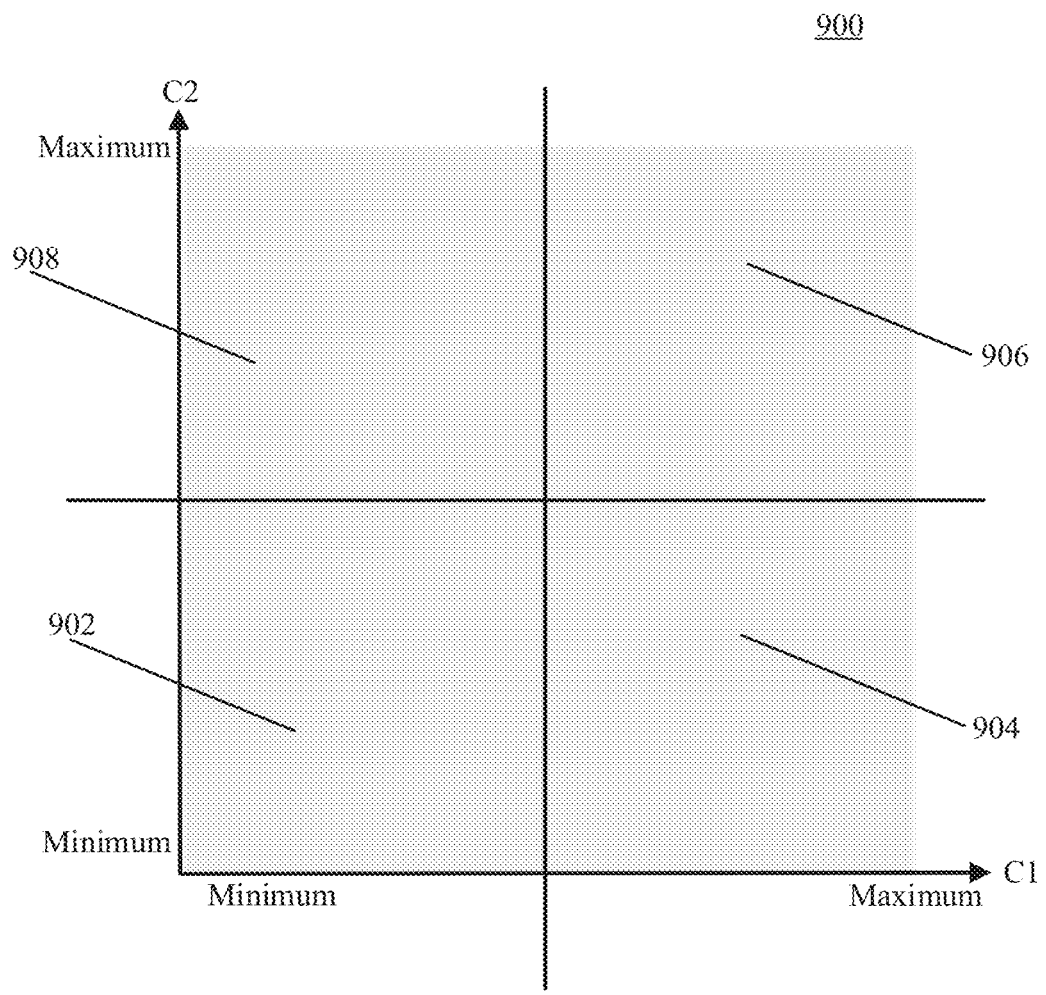
FIG. 20 is an illustrative block diagram of a value range map in accordance with the present invention.

Referring to FIG. 20, an illustrative value range map of a column set is shown and generally indicated at 900. For each dimension (C1 and C2), the value range (maximum— minimum) is split into half. Accordingly, the value range map 900 comprises four sub-regions 902, 904, 906 and 908. The value range map 900 can also be divided into, for example, nine, sixteen, twenty five or more sub-regions without deviating from the present teachings. Moreover, the value range map 900 can be, for example, three, four, five, six or more dimensional without deviating from the present teachings.

When each dimension's data distribution is uniform, all the sub-regions should have the same (or approximately the same) amount of data tuples, i.e., (the number of rows)/(the number of sub-regions). For a two dimensional value range map divided into four sub-regions, each sub-region has ¼ of the data rows of the column set. Each row is a data tuple, such as (10, 21). As used herein, 1/(the number of sub-regions) is termed as uniform sub-region data percentage; and (the number of rows)/(the number of sub-regions) is termed as uniform sub-region data amount.

Each square box (also termed herein as a bin) of the value range map 900 corresponds to a data tuple of the column set. A bin is said to be full if its corresponding data tuple exists in the column set. A bin is said to be empty if its corresponding data tuple does not exist in the column set. For uniform distribution value range map, each bin is full.

For each sub-region, if it has more data than uniform sub-region data amount, one or more other sub-regions would have less than the uniform sub-region data amount. In other words, when a sub-region has more data than uniform sub-region data amount (meaning some bins of the sub-regions corresponds to more than one row in the column set), some bins in one or more other sub-regions would be empty. Taking the value range map 900 as an example, suppose the sub-region 902 has 32% of the data (meaning 32% of the rows), one or more other sub-regions would have (0.32−0.25)*(the number of rows) bins empty. In such a case, the upper bound is then decreased by (0.32−0.25)*(the number of rows). The decreased upper bound is set as the estimated column set cardinality. As used here, the number of empty bins, such as (0.32−0.25)*(the number of rows) in the example above, is termed as the number of corresponding empty bins of the present sub-region.

Turning back to FIG. 19, at 846, for each sub-region, the computer program estimates the amount of data in it. In one implementation, the estimation is obtained using the multi-dimensional PDF that represents that point in the query plan. The PDF is first projected to a lower dimensional sub-space corresponding to the columns in the column set. It is then integrated over for each sub-region to estimate the percentage of data in each sub-region. At 848, for each column, the computer program determines the number of corresponding empty bins. At 850, for each subregion, the computer program revises the estimated columns set cardinality by subtracting the number of corresponding empty bins from it. The estimated columns set cardinality is initially set at the product of the estimates column cardinality.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   receiving, by a computing device, a sort request regarding data of a table, wherein the table includes a plurality of rows and a plurality of columns, wherein a row of the plurality of rows of data includes data elements in fields of the plurality of columns to produce a data unit;

determining, by the computing device, a plurality of probability traits of the data;

dividing, by the computing device, the sort request into a plurality of sub-sort requests based on the plurality of probability traits;

identifying, by the computing device, processing core resources of the computing device to perform the plurality of sub-sort requests based on the plurality of probability traits, wherein the computing device includes a plurality of nodes, and wherein a node of the plurality of nodes includes a plurality of computing core resources;

allocating, by the computing device, the plurality of sub-sort requests to the identified processing core resources in accordance with the plurality of probability traits;

allocating, by the computing device, a plurality of data portions of the data to the identified processing core resources in accordance with the plurality of probability traits;

executing, by a computing core resources of the identified computing core resources, an allocated sub-sort request of the plurality of sub-sort requests on a corresponding divided portion of the data to produce a sorted data portion; and joining, by the computing device, a plurality of sorted data portions produced by the identified computing core resources to produce sorted data.

2. The method of claim 1, wherein the determining the plurality of probability traits comprises:

performing a probability density function on data elements of a first column of the plurality of columns to produce a first probability density;

performing the probability density function on data elements of a second column of the plurality of columns to produce a second probability density; and performing the probability density function on the data elements of the first and second columns to produce a third probability density, wherein the first, second, and third probability densities correspond to probability traits of the plurality of probability traits.

3. The method of claim 1, wherein the determining the plurality of probability traits comprises:

performing a kernel density estimation on data elements of a first column of the plurality of columns to produce a first probability estimation;

performing the kernel density estimation on data elements of a second column of the plurality of columns to produce a second probability estimation; and performing the kernel density estimation on the data elements of the first and second columns to produce a third probability estimation, wherein the first, second, and third probability densities correspond to probability traits of the plurality of probability traits.

4. The method of claim 1, wherein dividing the sort request comprises:

determining a number of ranges based on the probability density function; and dividing the sort request into a number of sub-sort requests corresponding to a multiple of the number of ranges to produce the plurality of sub-sort requests.

5. The method of claim 1, wherein the identifying the processing core resources comprises:

determining a number of sub-sort requests in the plurality of sub-sort requests;

determining a number of processing core resources of the plurality of processing core resources of the plurality of nodes that will execute multiple sub-sort requests of the plurality of sub-sort requests; and based on the number of sub-sort requests and the number of processing core resources executing multiple sub-sort requests, identifying the processing core resources.

6. The method of claim 1 further comprises:

dividing the data into streams of data based on a number of ranges;

dividing the streams of data into the plurality of data portions in accordance with the plurality of probability traits; and depositing the plurality of data portions into a plurality of memory bins.

7. The method of claim 6 further comprises:

executing, by the computing core resources, the allocated sub-sort request on a data portion of the plurality of data portions in a memory bin of the plurality of memory bins to produce the sorted data portion; and retrieving, by the computing device, the plurality of sorted data portions from the plurality of memory bins in order to produce the sorted data.

* * * * *